(12) United States Patent
Gallagher

(10) Patent No.: US 7,369,859 B2
(45) Date of Patent: May 6, 2008

(54) METHOD AND SYSTEM FOR DETERMINING THE LOCATION OF AN UNLICENSED MOBILE ACCESS SUBSCRIBER

(75) Inventor: Michael D. Gallagher, San Jose, CA (US)

(73) Assignee: Kineto Wireless, Inc., Milpitas, CA (US)

( * ) Notice: Subject to any disclaimer, the term of this patent is extended or adjusted under 35 U.S.C. 154(b) by 69 days.

(21) Appl. No.: 11/096,800

(22) Filed: Mar. 31, 2005

(65) Prior Publication Data

US 2005/0181805 A1     Aug. 18, 2005

Related U.S. Application Data

(63) Continuation-in-part of application No. 11/013,883, filed on Dec. 15, 2004, which is a continuation-in-part of application No. 10/688,470, filed on Oct. 17, 2003, now Pat. No. 7,127,250.

(51) Int. Cl.
*H04Q 7/20* (2006.01)
(52) U.S. Cl. .................... 455/456.1; 455/435.2
(58) Field of Classification Search ............ 455/456.1, 455/435.2, 450, 454, 452.2, 432.2, 422.1, 455/426.1, 421
See application file for complete search history.

(56) References Cited

U.S. PATENT DOCUMENTS

| | | | |
|---|---|---|---|
| 5,101,501 A | 3/1992 | Gilhousen et al. |
| 5,109,528 A | 4/1992 | Uddenfeldt |
| 5,226,045 A | 7/1993 | Chuang |
| 5,235,632 A | 8/1993 | Raith |
| 5,260,944 A | 11/1993 | Tomabechi |
| 5,260,988 A | 11/1993 | Schellineig et al. |
| 5,267,261 A | 11/1993 | Blakeney, II et al. |
| 5,367,558 A | 11/1994 | Gillis et al. |
| 5,390,233 A | 2/1995 | Jensen et al. |
| 5,392,331 A | 2/1995 | Patsiokas et al. |
| 5,406,615 A | 4/1995 | Miller et al. |
| 5,428,601 A | 6/1995 | Owen |
| 5,442,680 A | 8/1995 | Schellinger et al. |
| 5,448,619 A | 9/1995 | Evans et al. |
| 5,507,035 A | 4/1996 | Bantz et al. |
| 5,533,027 A | 7/1996 | Akerberg et al. |
| 5,594,782 A | 1/1997 | Zicker et al. |
| 5,610,969 A | 3/1997 | McHenry |
| 5,634,193 A | 5/1997 | Ghisler |

(Continued)

FOREIGN PATENT DOCUMENTS

EP         0936777 A1      8/1999

(Continued)

OTHER PUBLICATIONS

U.S. Appl. No. 10/116,311, filed Apr. 2, 2002, Jahangir Mohammed, Non-Final Office Action of a related pending U.S. Patent Application, mailed: Feb. 9, 2006.

(Continued)

*Primary Examiner*—CongVan Tran
(74) *Attorney, Agent, or Firm*—Adeli & Tollen LLP

(57) ABSTRACT

A method and system for locating an unlicensed mobile access (UMA) subscriber. The method enables a user of a mobile station comprising a hand-set or the like that supports voice and data access via both licensed and unlicensed radio spectrums to be located. Accordingly, services requiring location information, such as 911 services, may be accessed when operating the mobile station under both UMA and licensed wireless network (e.g., cellular) sessions.

20 Claims, 14 Drawing Sheets

U.S. PATENT DOCUMENTS

| | | | |
|---|---|---|---|
| 5,640,414 A | 6/1997 | Blakeney, II et al. | |
| 5,659,598 A | 8/1997 | Byrne | |
| 5,659,878 A | 8/1997 | Uchida et al. | |
| 5,664,005 A | 9/1997 | Emery et al. | |
| 5,673,307 A | 9/1997 | Holland et al. | |
| 5,675,629 A | 10/1997 | Raffel et al. | |
| 5,724,658 A | 3/1998 | Hasan | |
| 5,732,076 A | 3/1998 | Ketseoglou et al. | |
| 5,745,852 A | 4/1998 | Khan et al. | |
| 5,758,281 A | 5/1998 | Emery et al. | |
| 5,796,727 A | 8/1998 | Harrison et al. | |
| 5,796,729 A | 8/1998 | Greaney et al. | |
| 5,815,525 A | 9/1998 | Smith | |
| 5,818,820 A | 10/1998 | Anderson et al. | |
| 5,822,681 A | 10/1998 | Chang et al. | |
| 5,825,759 A | 10/1998 | Liu | |
| 5,852,767 A | 12/1998 | Sugita | |
| 5,870,677 A | 2/1999 | Takahashi et al. | |
| 5,887,020 A | 3/1999 | Smith et al. | |
| 5,887,260 A | 3/1999 | Nakata | |
| 5,890,055 A | 3/1999 | Chu et al. | |
| 5,890,064 A | 3/1999 | Widergen et al. | |
| 5,903,834 A | 5/1999 | Wallstedt et al. | |
| 5,915,224 A | 6/1999 | Jonsson | |
| 5,926,760 A | 7/1999 | Khan et al. | |
| 5,936,949 A | 8/1999 | Pasternak et al. | |
| 5,940,512 A | 8/1999 | Tomoike | |
| 5,946,622 A | 8/1999 | Bojeryd | |
| 5,949,773 A | 9/1999 | Bhalla et al. | |
| 5,960,341 A | 9/1999 | LeBlanc et al. | |
| 5,995,828 A | 11/1999 | Nishida | |
| 6,016,318 A | 1/2000 | Tomoike | |
| 6,035,193 A | 3/2000 | Buhrmann et al. | |
| 6,052,592 A | 4/2000 | Schellinger et al. | |
| 6,101,176 A * | 8/2000 | Honkasalo et al. | 370/335 |
| 6,112,080 A | 8/2000 | Anderson et al. | |
| 6,112,088 A | 8/2000 | Haartsen | |
| 6,119,000 A | 9/2000 | Stephenson et al. | |
| 6,130,886 A | 10/2000 | Ketseoglou et al. | |
| 6,134,227 A | 10/2000 | Magana | |
| 6,138,019 A | 10/2000 | Trompower et al. | |
| 6,226,515 B1 | 5/2001 | Pauli | |
| 6,236,852 B1 | 5/2001 | Veerasamy et al. | |
| 6,243,581 B1 | 6/2001 | Jawanda | |
| 6,256,511 B1 | 7/2001 | Brown | |
| 6,263,211 B1 | 7/2001 | Brunner | |
| 6,269,086 B1 | 7/2001 | Magana et al. | |
| 6,320,873 B1 | 11/2001 | Nevo et al. | |
| 6,327,470 B1 | 12/2001 | Ostling | |
| 6,359,872 B1 | 3/2002 | Mahany et al. | |
| 6,374,102 B1 | 4/2002 | Brachman et al. | |
| 6,381,457 B1 | 4/2002 | Carlsson et al. | |
| 6,389,059 B1 | 5/2002 | Smith et al. | |
| 6,415,158 B1 | 7/2002 | King et al. | |
| 6,430,395 B2 | 8/2002 | Arazi et al. | |
| 6,445,921 B1 | 9/2002 | Bell | |
| 6,463,307 B1 | 10/2002 | Larsson et al. | |
| 6,539,237 B1 | 3/2003 | Sayers et al. | |
| 6,542,516 B1 | 4/2003 | Vialen et al. | |
| 6,553,219 B1 | 4/2003 | Vilander et al. | |
| 6,556,822 B1 | 4/2003 | Matsumoto | |
| 6,556,825 B1 | 4/2003 | Mansfield | |
| 6,556,830 B1 | 4/2003 | Lenzo | |
| 6,574,266 B1 | 6/2003 | Haartsen | |
| 6,587,444 B1 | 7/2003 | Lenzo et al. | |
| 6,633,761 B1 | 10/2003 | Singhal | |
| 6,643,512 B1 | 11/2003 | Ramaswamy | |
| 6,647,426 B2 | 11/2003 | Mohammed | |
| 6,658,250 B1 | 12/2003 | Ganesan et al. | |
| 6,665,276 B1 | 12/2003 | Culbertson et al. | |
| 6,675,009 B1 | 1/2004 | Cook | |
| 6,680,923 B1 | 1/2004 | Leon | |
| 6,708,033 B1 | 3/2004 | Linkola et al. | |
| 6,711,400 B1 | 3/2004 | Aura | |
| 6,766,160 B1 | 7/2004 | Lemilainen et al. | |
| 6,788,656 B1 | 9/2004 | Smolentzov et al. | |
| 6,801,519 B1 | 10/2004 | Mangel | |
| 6,801,772 B1 | 10/2004 | Townend et al. | |
| 6,801,777 B2 | 10/2004 | Rusch | |
| 6,807,417 B2 | 10/2004 | Sallinen | |
| 6,824,048 B1 | 11/2004 | Itabashi et al. | |
| 6,826,154 B2 | 11/2004 | Subbiah et al. | |
| 6,829,227 B1 | 12/2004 | Pitt | |
| 6,842,462 B1 | 1/2005 | Ramjee et al. | |
| 6,845,095 B2 | 1/2005 | Krishnarajah et al. | |
| 6,895,255 B1 | 5/2005 | Bridgelall | |
| 6,909,705 B1 | 6/2005 | Lee et al. | |
| 6,922,559 B2 * | 7/2005 | Mohammed | 455/421 |
| 6,925,074 B1 | 8/2005 | Vikberg et al. | |
| 6,937,862 B2 | 8/2005 | Back et al. | |
| 6,970,719 B1 | 11/2005 | McConnell et al. | |
| 7,009,952 B1 | 3/2006 | Razavilar et al. | |
| 2001/0029186 A1 | 10/2001 | Canyon et al. | |
| 2001/0031645 A1 | 10/2001 | Jarrett | |
| 2001/0046860 A1 | 11/2001 | Lee | |
| 2001/0049790 A1 | 12/2001 | Faccin et al. | |
| 2002/0045459 A1 | 4/2002 | Morikawa | |
| 2002/0066036 A1 | 5/2002 | Makineni | |
| 2002/0075844 A1 | 6/2002 | Hagen | |
| 2002/0082015 A1 | 6/2002 | Wu | |
| 2002/0085516 A1 | 7/2002 | Bridgelall | |
| 2002/0102974 A1 | 8/2002 | Raith | |
| 2002/0118674 A1 | 8/2002 | Faccin et al. | |
| 2002/0132630 A1 | 9/2002 | Arazi et al. | |
| 2002/0142761 A1 | 10/2002 | Wallstedt et al. | |
| 2002/0147008 A1 * | 10/2002 | Kallio | 455/426 |
| 2002/0147016 A1 | 10/2002 | Arazi et al. | |
| 2002/0155829 A1 | 10/2002 | Proctor, Jr. et al. | |
| 2002/0160811 A1 | 10/2002 | Jannette et al. | |
| 2002/0164984 A1 | 11/2002 | Thakker | |
| 2002/0166068 A1 | 11/2002 | Kilgore | |
| 2002/0191575 A1 | 12/2002 | Kalavade et al. | |
| 2002/0197984 A1 | 12/2002 | Monin et al. | |
| 2003/0007475 A1 | 1/2003 | Tsuda et al. | |
| 2003/0031151 A1 | 2/2003 | Sharma et al. | |
| 2003/0043773 A1 | 3/2003 | Chang | |
| 2003/0087653 A1 | 5/2003 | Leung | |
| 2003/0112789 A1 | 6/2003 | Heinonen | |
| 2003/0119480 A1 | 6/2003 | Mohammed | |
| 2003/0119490 A1 | 6/2003 | Mohammed | |
| 2003/0119527 A1 | 6/2003 | Labun | |
| 2003/0119548 A1 | 6/2003 | Mohammed | |
| 2003/0130008 A1 | 7/2003 | Rajaniemi et al. | |
| 2003/0139180 A1 | 7/2003 | McIntosh et al. | |
| 2003/0142673 A1 | 7/2003 | Patil | |
| 2003/0176186 A1 | 9/2003 | Mohammed | |
| 2003/0193952 A1 | 10/2003 | O'Neill | |
| 2003/0210199 A1 | 11/2003 | Sward et al. | |
| 2003/0219024 A1 | 11/2003 | Purnadai et al. | |
| 2004/0008649 A1 | 1/2004 | Wybenga | |
| 2004/0009749 A1 | 1/2004 | Arazi et al. | |
| 2004/0013099 A1 | 1/2004 | O'Neill | |
| 2004/0037312 A1 | 2/2004 | Spear | |
| 2004/0053623 A1 | 3/2004 | Hoff et al. | |
| 2004/0068571 A1 | 4/2004 | Ahmavaara | |
| 2004/0077355 A1 | 4/2004 | Krenick et al. | |
| 2004/0077356 A1 | 4/2004 | Krenick et al. | |
| 2004/0077374 A1 | 4/2004 | Terry | |
| 2004/0116120 A1 | 6/2004 | Mohammed et al. | |
| 2004/0147223 A1 | 7/2004 | Cho | |
| 2004/0171378 A1 | 9/2004 | Rautila | |
| 2004/0192211 A1 | 9/2004 | Gallagher et al. | |
| 2004/0202132 A1 | 10/2004 | Heinonen | |
| 2004/0203346 A1 | 10/2004 | Myhre et al. | |

| | | | |
|---|---|---|---|
| 2004/0203737 A1 | 10/2004 | Myhre et al. | |
| 2004/0203800 A1 | 10/2004 | Myhre et al. | |
| 2004/0203815 A1* | 10/2004 | Shoemake et al. | 455/450 |
| 2004/0240525 A1* | 12/2004 | Karabinis et al. | 375/132 |
| 2004/0259541 A1* | 12/2004 | Hicks et al. | 455/426.1 |
| 2005/0064896 A1 | 3/2005 | Rautiola et al. | |
| 2005/0101245 A1 | 5/2005 | Ahmavaara | |
| 2005/0101329 A1 | 5/2005 | Gallagher | |
| 2005/0181805 A1 | 8/2005 | Gallagher | |
| 2005/0186948 A1 | 8/2005 | Gallagher | |
| 2005/0198199 A1 | 9/2005 | Dowling | |
| 2005/0207395 A1 | 9/2005 | Mohammed | |
| 2005/0255879 A1 | 11/2005 | Shi | |
| 2005/0265279 A1 | 12/2005 | Markovic | |
| 2005/0266853 A1 | 12/2005 | Gallagher | |
| 2005/0271008 A1 | 12/2005 | Gallagher | |
| 2005/0272424 A1 | 12/2005 | Gallagher | |
| 2005/0272449 A1 | 12/2005 | Gallagher | |
| 2006/0009201 A1 | 1/2006 | Gallagher | |
| 2006/0009202 A1 | 1/2006 | Gallagher | |
| 2006/0019656 A1 | 1/2006 | Gallagher | |
| 2006/0019657 A1 | 1/2006 | Gallagher | |
| 2006/0019658 A1 | 1/2006 | Gallagher | |
| 2006/0025143 A1 | 2/2006 | Gallagher | |
| 2006/0025144 A1 | 2/2006 | Gallagher | |
| 2006/0025145 A1 | 2/2006 | Gallagher | |
| 2006/0025146 A1 | 2/2006 | Gallagher | |
| 2006/0025147 A1 | 2/2006 | Gallagher | |
| 2006/0079258 A1 | 4/2006 | Gallagher | |
| 2006/0079259 A1 | 4/2006 | Gallagher | |
| 2006/0079273 A1 | 4/2006 | Gallagher | |
| 2006/0079274 A1 | 4/2006 | Gallagher | |
| 2006/0094431 A1* | 5/2006 | Saifullah et al. | 455/436 |
| 2006/0098598 A1 | 5/2006 | Gallagher | |

FOREIGN PATENT DOCUMENTS

| | | |
|---|---|---|
| EP | 1207708 B1 | 10/2004 |
| GB | 2282735 A | 4/1995 |
| WO | WO 9204796 A1 | 3/1992 |
| WO | WO 9724004 A1 | 7/1997 |
| WO | WO 9948312 A1 | 9/1999 |
| WO | WO 9948315 A1 | 9/1999 |
| WO | WO 0028762 A1 | 5/2000 |
| WO | WO 0051387 A1 | 8/2000 |
| WO | WO 02/45456 A1 | 6/2002 |
| WO | WO 03039009 A2 | 5/2003 |
| WO | WO 03039009 A3 | 5/2003 |
| WO | WO 03092312 A1 | 11/2003 |
| WO | WO 04002051 A2 | 12/2003 |
| WO | WO 2004034219 A2 | 4/2004 |
| WO | WO 2004039111 A1 | 5/2004 |
| WO | WO 2005006597 A1 | 1/2005 |
| WO | WO 2005107169 A1 | 11/2005 |
| WO | WO 2005107297 A1 | 11/2005 |
| WO | PCT/US2005/040689 | 3/2006 |
| WO | WO 2005114918 A3 | 3/2006 |

OTHER PUBLICATIONS

U.S. Appl. No. 10/115,767, filed Apr. 2, 2002, Jahangir Mohammed, Non-Final Office Action of a related pending U.S. Patent Application, mailed: Dec. 22, 2005.

U.S. Appl. No. 10/115,835, filed Apr. 2, 2002, Jahangir Mohammed, Non-Final Office Action of a related pending U.S. Patent Application, mailed: Jul. 25, 2005.

U.S. Appl. No. 10/116,186, filed Apr. 2, 2002, Jahangir Mohammed, Final Office Action of a related pending U.S. Patent Application, mailed: Feb. 1, 2006.

U.S. Appl. No. 10/251,901, filed Sep. 20, 2002, Michael D. Gallagher, Non-Final Office Action of a related pending U.S. Patent Application, mailed: May 5, 2005.

U.S. Appl. No. 10/688,470, filed Oct. 17, 2003, Michael D. Gallagher, Non-Final Office Action of a related pending U.S. Patent Application, mailed: Dec. 15, 2005.

U.S. Appl. No. 11/004,439, filed Dec. 3, 2004, Michael D. Gallagher, Non-Final Office Action of a related pending U.S. Patent Application, mailed: Sep. 21, 2005.

*Ericsson Press Release*: "Ericsson presents the Mobile@Hometm concept," Mar. 21, 2001, http://www.ericsson.com/press/archive/2001Q1/20010321-0048.html, printed Mar. 21, 2006, pp. 1-2.

Claus Lindholt Hansen et al., "Mobile@Home—a New Use Case for Bluetooth in the Access Network," *LM Ericsson Business Unit Multi-Service Networks*, ISSLS 2002, Apr. 14-18, 2002, Seoul, Korea, www.issls-council.org/proc02/papers/S6A3m.pdf, printed Dec. 8, 2003, 10 pages.

Perkins, Charles E., "Simplified Routing for Mobile Computers using TCP/IP, Wireless LAN Implementation," *IBM T.J. Watson Research Center*, 0-8186-2625-9/92 1992 Proceeding, IEEE Conference on Sep. 17-18, 1992, pp. 7-13.

Wu, Jon C. et al., "Intelligent Handoff for Mobile Wireless Internet," *Mobile Networks and Applications*, 6, 2001 Kluwer Academic Publishers, Manufactured in the Netherlands (2001) 67-79.

"Digital cellular telecommunications system (Phase 2+); Universal Mobile Telecommunications System (UMTS); Mobile radio interface Layer 3 specification; Core network protocols; Stage 3 (3GPP TS 24.008 version 5.6.0 Release 5); ETSI TS 124 008," ETSI Standards, European Telecommunications Standards Institute, Sophia-Antipo, FR, vol. 3-CN1, No. V560, Dec. 2002, pp. 293-317, XP014007949, ISSN: 0000-0001.

"3rd Generation Partnership Project; Technical Specification Group Services and System Aspects; 3GPP System to Wireless Local Area Network (WLAN) Interworking; System Description (Release 6); 3GPP TS 23.234," ETSI Standards, European Telecommunications Standards Institute, Sophia-Antipo, FR, vol. 3-SA, No. V230, Nov. 2003, XP014023920, ISSN: 0000-0001.

U.S. Appl. No. 11/225,870, filed Sep. 12, 2005, Michael Gallagher, Non-Final Office Action of related case mailed: May 30, 2006.

U.S. Appl. No. 11/227,842, filed Sep. 14, 2005, Michael Gallagher, Non-Final Office Action of related case mailed: Jun. 5, 2006.

U.S. Appl. No. 11/228,853, filed Sep. 15, 2005, Michael Gallagher, Non-Final Office Action of related case mailed: Jun. 6, 2006.

U.S. Appl. No. 11/229,470, filed Sep. 15, 2005, Michael Gallagher, Non-Final Office Action of related case mailed: Jun. 5, 2006.

U.S. Appl. No. 11/097,866, filed Mar. 31, 2005, Michael D. Gallagher et al., Non-published patent application (specification, drawings, claims, abstract) of a related pending U.S. Patent Application.

U.S. Appl. No. 11/212,353, filed Aug. 26, 2005, Jason Shi et al., Non-published patent application (specification, drawings, claims, abstract) of a related pending U.S. Patent Application.

U.S. Appl. No. 10/116,023, filed Apr. 2, 2002, Jahangir Mohammed, Non-Final Office Action of related case mailed: Apr. 13, 2006.

U.S. Appl. No. 11/004,439, filed Dec. 3, 2004, Michael Gallagher, Non-Final Office Action of related case mailed: Apr. 21, 2006.

U.S. Appl. No. 11/225,398, filed Sep. 12, 2005, Michael Gallagher, Non-Final Office Action of related case mailed: Apr. 5, 2006.

U.S. Appl. No. 11/225,871, filed Sep. 12, 2005, Michael Gallagher, Non-Final Office Action of related case mailed: Mar. 30, 2006.

U.S. Appl. No. 11/225,872, filed Sep. 12, 2005, Michael Gallagher, Non-Final Office Action of related case mailed: May 8, 2006.

U.S. Appl. No. 11/226,610, filed Sep. 13, 2005, Michael Gallagher, Non-Final Office Action of related case mailed: Mar. 29, 2006.

U.S. Appl. No. 11/226,617, filed Sep. 13, 2005, Michael Gallagher, Non-Final Office Action of related case mailed: Apr. 4, 2006.

U.S. Appl. No. 11/227,573, filed Sep. 14, 2005, Michael Gallagher, Non-Final Office Action of related case mailed: Apr. 16, 2006.

U.S. Appl. No. 11/227,784, filed Sep. 14, 2005, Michael Gallagher, Non-Final Office Action of related case mailed: Mar. 28, 2006.

U.S. Appl. No. 11/227,840, filed Sep. 14, 2005, Michael Gallagher, Non-Final Office Action of related case mailed: Apr. 21, 2006.

* cited by examiner

METHOD AND SYSTEM FOR DETERMINING THE LOCATION OF AN UNLICENSED MOBILE ACCESS SUBSCRIBER

CROSS-REFERENCE TO RELATED APPLICATIONS

This application is a Continuation in Part of U.S. Nonprovisional application Ser. No. 11/013,883, entitled "Apparatus and Method for Extending the Coverage Area of A Licensed Wireless Communication System Using an Unlicensed Wireless Communication System," filed Dec. 15, 2004, which is a Continuation in Part of U.S. Nonprovisional application Ser. No. 10/688,470, entitled "Apparatus and Method for Extending the Coverage Area of a Licensed Wireless Communication System Using an Unlicensed Wireless Communication System," filed Oct. 17, 2003 now U.S. Pat. No. 7,127,250.

This application is also related to commonly owned U.S. applications: Ser. No. 10/115,833, entitled "Unlicensed Wireless Communications Base Station to Facilitate Unlicensed and Licensed Wireless Communications with a Subscriber Device, and Method of Operation," filed Apr. 2, 2002; and application Ser. No. 10/251,901, entitled "Apparatus for Supporting the Handover of a Telecommunication Session between a Licensed Wireless System and an Unlicensed Wireless System," filed Sep. 20, 2002, the contents of each of which are hereby incorporated by reference.

FIELD OF THE INVENTION

The field of invention relates generally to telecommunications. More particularly, this invention relates to a technique for determining the location of a mobile station accessing a core network via an unlicensed wireless system.

BACKGROUND INFORMATION

Licensed wireless systems provide mobile wireless communications to individuals using wireless transceivers. Licensed wireless systems refer to public cellular telephone systems and/or Personal Communication Services (PCS) telephone systems. Wireless transceivers include cellular telephones, PCS telephones, wireless-enabled personal digital assistants, wireless modems, and the like.

Licensed wireless systems utilize wireless signal frequencies that are licensed from governments. Large fees are paid for access to these frequencies. Expensive base station (BS) equipment is used to support communications on licensed frequencies. Base stations are typically installed approximately a mile apart from one another (e.g., cellular towers in a cellular network). The wireless transport mechanisms and frequencies employed by typical licensed wireless systems limit both data transfer rates and range. As a result, the quality of service (voice quality and speed of data transfer) in licensed wireless systems is considerably inferior to the quality of service afforded by landline (wired) connections. Thus, the user of a licensed wireless system pays relatively high fees for relatively low quality service.

Landline (wired) connections are extensively deployed and generally perform at a lower cost with higher quality voice and higher speed data services. The problem with landline connections is that they constrain the mobility of a user. Traditionally, a physical connection to the landline was required.

In the past few years, the use of unlicensed wireless communication systems to facilitate mobile access to landline-based networks have seen rapid growth. For example, such unlicensed wireless systems may support wireless communication based on the IEEE 802.11a, b or g standards (WiFi), or the Bluetooth™ standard. The mobility range associated with such systems is typically on the order of 100 meters or less. A typical unlicensed wireless communication system includes a base station comprising a wireless access point (AP) with a physical connection (e.g., coaxial, twisted pair, or optical cable) to a landline-based network. The AP has a RF transceiver to facilitate communication with a wireless handset that is operative within a modest distance of the AP, wherein the data transport rates supported by the WiFi and Bluetooth™ standards are much higher than those supported by the aforementioned licensed wireless systems. Thus, this option provides higher quality services at a lower cost, but the services only extend a modest distance from the base station.

Currently, technology is being developed to integrate the use of licensed and unlicensed wireless systems in a seamless fashion, thus enabling a user to access, via a single handset, an unlicensed wireless system when within the range of such a system, while accessing a licensed wireless system when out of range of the unlicensed wireless system. However, this introduces a problem with respect to user location, particularly for emergency services. While there are known techniques for locating a user's mobile device (e.g., cell phone) when accessing a licensed wireless system (cellular network), the implementation model for unlicensed wireless systems prevents the location of a user from being easily ascertained. For example, a typical cellular network is managed by a single entity (or multiple entities sharing management responsibilities), enabling the location of a mobile device to be determined via built-in network infrastructure. In contrast, wireless access points are typically deployed by individual users or companies, and often only provide private access. Thus, there is no single management entity that is able to control access to and use of unlicensed wireless systems. Accordingly, there is no existing infrastructure for determining the location of users accessing unlicensed wireless networks.

SUMMARY OF THE INVENTION

In accordance with aspects of the present invention, a method and system for locating an unlicensed mobile access (UMA) subscriber is disclosed. The method enables a user of a mobile station comprising a hand-set or the like that supports voice and data access via both licensed and unlicensed radio spectrums to be located. Accordingly, services requiring location information, such as emergency services (e.g., user dials 911), may be accessed when operating the mobile station under both UMA and cellular sessions.

In accordance with one embodiment, the subscriber employs a mobile station (MS) supporting both UMA and GSM sessions to establish a UMA session with a UMA service provider. The UMA session is facilitated by a base station comprising a wireless access point (AP) employing an unlicensed radio frequency spectrum and an UMA network controller (UNC), operatively coupled to the AP via an access network. Information identifying the AP is forwarded to the UNC. The UNC then performs a lookup operation in a database managed by the UMA service provider to determine if a record identifying the location of the AP is present. If such a record is not present or is out of date, UNC submits a location service request to a GSM-based location service to identify the location of the MS using the aforementioned known techniques for locating a user's mobile device when accessing a licensed GSM wireless system. Once the location of the MS is obtained, corresponding information is returned to the UNC and a record linking the location of the AP serving the MS is stored in a service provisioning server database managed by the UMA service provider.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 1B illustrates protocol layers of a mobile set in accordance with one embodiment;

FIG. 1C illustrates a method of protocol conversion in accordance with one embodiment;

DETAILED DESCRIPTION

Embodiments of methods and apparatus for determining the location of a user while accessing an unlicensed wireless system are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The present invention is directed towards seamlessly providing the location of a mobile station (MS) using both a licensed wireless system and an unlicensed wireless system. The unlicensed wireless system is a short-range wireless system, which may be described as an "indoor" solution. However, it will be understood through the application that the unlicensed wireless system includes unlicensed wireless systems that cover not only a portion of a building but also local outdoor regions, such as outdoor portions of a corporate campus serviced by an unlicensed wireless system. The mobile station may, for example, be a wireless phone, smart phone, personal digital assistant, or mobile computer. The "mobile station" may also, for example, be a fixed wireless device providing a set of terminal adapter functions for connecting Integrated Services Digital Network (ISDN) or Plain Old Telephone Service (POTS) terminals to the wireless system. Representative of this type of device is the Phonecell line of products from Telular Corporation of Chicago, Ill. Application of the present invention to this type of device enables the wireless service provider to offer so-called landline replacement service to users, even for user locations not sufficiently covered by the licensed wireless system.

Throughout the following description, acronyms commonly used in the telecommunications industry for wireless services are utilized along with acronyms specific to the present invention. A table of acronyms specific to this application is included in Appendix I.

Figure 1A:
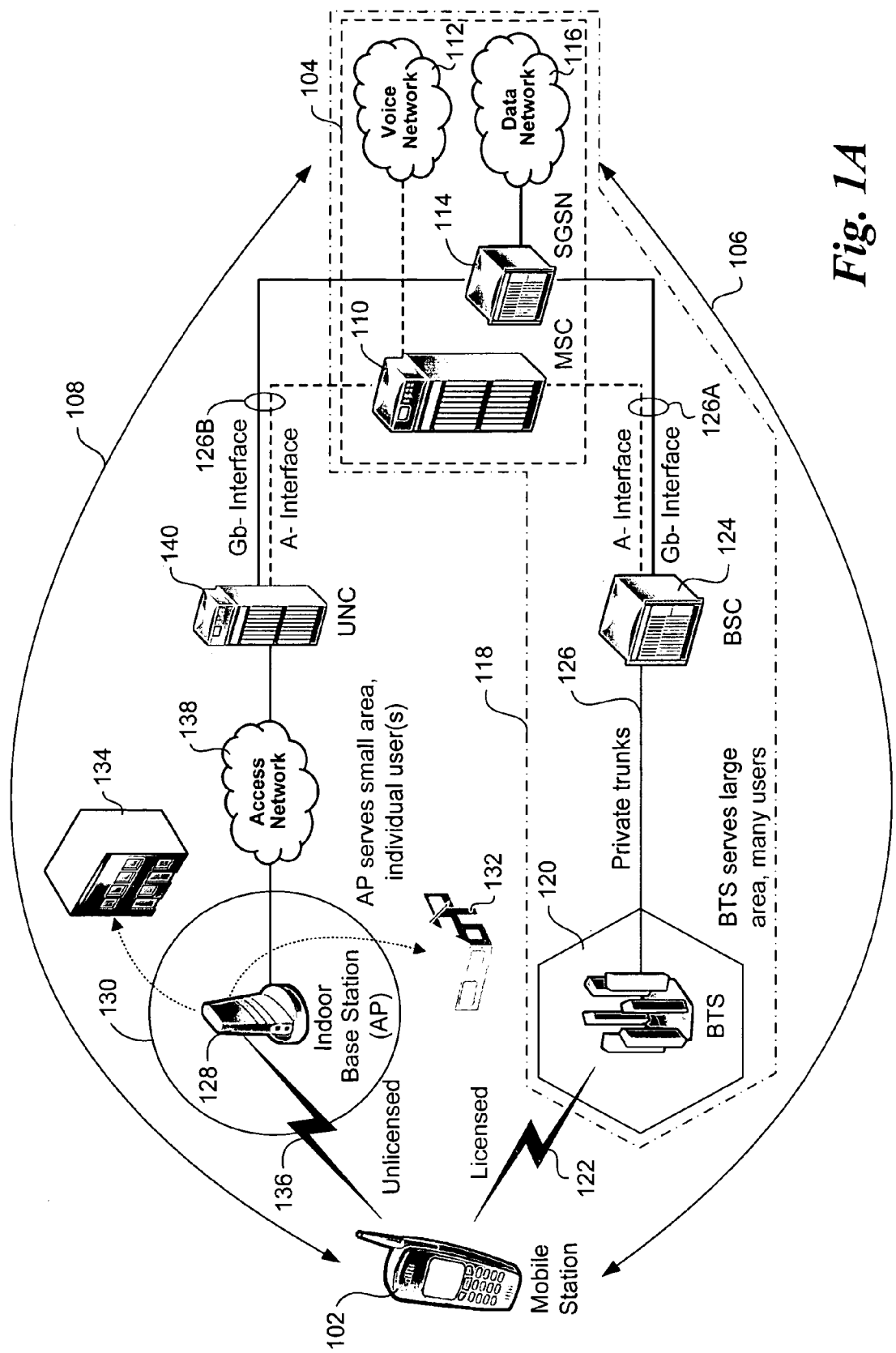
FIG. 1A provides an overview of the indoor access network (IAN) mobile service solution in accordance with one embodiment of the present invention.

FIG. 1A illustrates an Unlicensed Mobile Access (UMA) architecture 100 in accordance with one embodiment of the present invention. UMA architecture 100 enables a user of a mobile station 102 to access a voice and telecommunications network 104 via either a licensed wireless communications session 106, or an unlicensed wireless communication session 108. The telecommunications network 104 includes a mobile switching center (MSC) 110, which provides access to a voice network 112, and a Serving GPRS (General Packet Radio Service) Support Node (SGSN) 114, which provides access to a data network 116. MSC 110 also provides an internal visitor location register (VLR) function, as explained in further detail below.

In further detail, the licensed wireless communication session is facilitated by infrastructure provided by a licensed wireless network 118 that includes telecommunications network 104. In the illustrated embodiment, licensed wireless network 118 depicts components common to a GSM-(Global System for Mobile Communication) based cellular network that includes multiple base transceiver stations (BTS) 120 (of which only one is shown for simplicity) that facilitate wireless communication services for various mobile stations 102 via respective licensed radio links 122 (e.g., radio links employing radio frequencies within a licensed bandwidth). Typically, the multiple BTSs 120 are configured in a cellular configuration (one per each cell) that covers a wide service area. The various BTSs 120 for a given area or region are managed by a base station controller (BSC) 124, with each BTS 120 communicatively-coupled to its BSC 124 via a private trunk 126. In general, a large licensed wireless network, such as that provided by a regional or nationwide mobile services provider, will include multiple BSCs 124.

Each BSC 124 communicates with telecommunications network 104 through a standard base station controller interface 126. For example, a BSC 124 may communicate with MSC 110 via the GSM A-interface for circuit switched voice services and with SGSN 114 via the GSM Gb interface for packet data services (GPRS). Conventional licensed voice and data networks 104 include protocols to permit seamless handoffs from one recognized BSC 124 to another BSC (not shown).

An unlicensed communication session 108 is facilitated via an (wireless) access point (AP) 128 comprising an indoor base station 130. Typically, AP 128 will be located in a fixed structure, such as a home 132 or an office building 134. In one embodiment, the service area of indoor base station 130 includes an indoor portion of a building, although it will be understood that the service area of an indoor base station may include an outdoor portion of a building or campus. As indicated by the arrow representing unlicensed communication session 108, the mobile station 102 may be connected to the telecommunications network 114 via a second data path that includes an unlicensed wireless channel 136, access point 128, an access network 138, and an unlicensed mobile access network controller (UNC) 140. The UNC 140 communicates with telecommunications network 104 using a base station controller interface 126B that is similar to base station controller interface 126A, and includes a GSM A interface and Gb interface. As described below in more detail, indoor base station 128 and indoor network controller 132 may include software entities stored in memory and executing on one or more microprocessors (not shown in FIG. 1A) adapted to perform protocol conversion.

As described below in more detail, indoor base station 128 and UMA network controller 140 may include software entities stored in memory and executing on one or more microprocessors (not shown in FIG. 1A) adapted to perform protocol conversion.

The unlicensed wireless channel 136 is facilitated by a radio link employing a wavelength (or wavelength range) in an unlicensed, free spectrum (e.g., spectrum around 2.4 GHz, 5 GHz, 11-66 GHz). An unlicensed wireless service hosting unlicensed wireless channel 136 may have an associated communication protocol. As examples, the unlicensed wireless service may be a Bluetooth™ compatible wireless service, or a wireless local area network (LAN) (WiFi) service (e.g., the IEEE 802.11a, b, or g wireless standard). This provides the user with potentially improved quality of service in the service regions of the unlicensed wireless service (i.e., within the service range of a corresponding AP). Thus, when a subscriber is within range of the unlicensed AP, the subscriber may enjoy low cost, high speed, and high quality voice and data services. In addition, the subscriber enjoys extended service range since the handset can receive services deep within a building at locations that otherwise may not be reliably serviced by a licensed wireless system. At the same time, the subscriber can roam outside the range of the unlicensed AP without dropping communications. Instead, roaming outside the range of the unlicensed AP results in a seamless handoff (also referred to as a handover) wherein communication services are automatically provided by the licensed wireless system, as described in more detail in U.S. patent application Ser. No. 10/115,833, the contents of which are hereby incorporated by reference.

In one embodiment, mobile station 102 includes a microprocessor and memory (not shown) that stores computer program instructions for executing wireless protocols for managing communication sessions. As illustrated in FIG. 1B, in one embodiment the mobile station 102 includes a layer 1 protocol layer 142, layer 2 protocol layer 144, and a layer 3 signaling protocol layer for the licensed wireless service that includes a radio resource (RR) sublayer 146, a mobility management (MM) sublayer 148, and a call management (CM) layer 150. It will be understood that the level 1, level 2, and level 3 layers may be implemented as software modules, which may also be described as software "entities." In accordance with a common nomenclature for licensed wireless services, layer 1 is the physical layer, i.e., the physical baseband for a wireless communication session. The physical layer is the lowest layer of the radio interface and provides functions to transfer bit streams over physical radio links. Layer 2 is the data link layer. The data link layer provides signaling between the mobile station and the base station controller. The RR sublayer is concerned with the management of an RR-session, which is the time that a mobile station is in a dedicated mode, as well as the configuration of radio channel, power controller, discontinuous transmission and reception, and handovers. The mobility management layer manages issues that arise from the mobility of the subscriber. The mobility management layer may, for example, deal with mobile station location, security functions, and authentication. The call control management layer provides controls for end-to-end call establishment. These functions for a licensed wireless system are well known by those in the art of wireless communication.

In one embodiment of the present invention, the mobile station also includes an unlicensed wireless service physical layer 152 (i.e., a physical layer for unlicensed wireless service such as Bluetooth, WiFi, or other unlicensed wireless channel (e.g., WiMAX)). The mobile station also includes an unlicensed wireless service level 2 link layer 154, and an unlicensed wireless service radio resource sublayer(s) 156. An access mode switch 160 is included for the mobile management 148 and call management layers 150 to access the unlicensed wireless service radio resource sublayer 156 and unlicensed wireless service link layer 154 when the mobile station 102 is within range of an unlicensed AP 128 and to support switching between licenced RR sublayer 146 and unlicensed wireless service RR sublayer 156.

The unlicensed radio resource sublayer 156 and unlicensed link layer 154 may include protocols specific to the unlicensed wireless service utilized in addition to protocols selected to facilitate seamless handoff between licensed and unlicensed wireless systems, as described below in more detail. Consequently, the unlicensed radio resource sublayer 156 and unlicensed link layer 154 need to be converted into a format compatible with a conventional base station controller interface protocol 126 recognized by a MSC, SGSN, or other voice or data network.

Referring to FIG. 1C, in one embodiment of the present invention, the mobile station 102, AP 128 and UNC 140 provide an interface conversion function to convert the level 1, level 2, and level 3 layers of the unlicensed service into a conventional base station subnetwork (BSS) interface 126B (e.g., an A-interface or a Gb-interface). As a result of the protocol conversion, a communication session may be established that is transparent to the voice network/data network 104, i.e., the voice/data network 104 uses its standard interface and protocols for the communication session as it would with a conventional communication session handled by a conventional base transceiver station. For example, in some embodiments the mobile station 102 and UNC 140 are configured to initiate and forward location update and service requests. As a result, protocols for a seamless handoff of services that is transparent to voice/data network 104 are facilitated. This permits, for example, a single phone number to be used for both the licensed wireless service and the unlicensed wireless service. Additionally, the present invention permits a variety of services that were traditionally offered only through licensed wireless services to be offered through an unlicensed wireless service. The user thus gets the benefit of potentially higher quality service when their mobile station is located within the area serviced by a high bandwidth unlicensed wireless service while also having access to conventional phone services.

The licensed wireless service may comprise any licensed wireless service having a defined BSS interface protocol 126 for a voice/data network 104. In one embodiment, the licensed wireless service is a GSM/GPRS radio access network, although it will be understood that embodiments of the present invention include other licensed wireless services. For this embodiment, the UNC 140 interconnects to the GSM core network via the same base station controller interfaces 126 used by a standard GSM BSS network element. For example, in a GSM application, these interfaces are the GSM A-interface for circuit switched voice services and the GSM Gb interface for packet data services (GPRS). In a UMTS (Universal Mobile Telecommunications System) application of the invention, the UNC 140 interconnects to the UMTS network using a UMTS Iu-cs interface for circuit switched voice services and the UMTS Iu-ps interface for packet data services. In a CDMA application of the invention, the UNC 140 interconnects with the CDMA network using the CDMA A1 and A2 interfaces for circuit switched voice services and the CDMA A10 and A11 interfaces for packet data services.

In a GSM/GPRS embodiment, UNC 140 appears to the GSM/GPRS core network as a GSM BSS network element and is managed and operated as such. In this architecture the principle elements of transaction control (e.g., call processing) are provided by higher network elements; namely the MSC 110 visitor location register (VLR) and the SGSN 114. Authorized mobile stations are allowed access to the GSM/GPRS core network either directly through the GSM radio access network if they are outside of the service area of an AP 128 or via the UMA network system if they are within the service area of an AP.

Since a communication session hosted by the UMA architecture 100 is transparent to a voice network 112 or data network 116, the unlicensed wireless service may support all user services that are typically offered by a wireless service provider. In the GSM case, this typically includes the following basic services: Telephony; Emergency call (e.g., E911 calling in North America); Short message, mobile-terminated point-to-point (MT/PP); Short message, mobile-originated point-to-point (MO/PP); GPRS bearer services; Handover (outdoor-to-indoor, indoor-to-outdoor, voice, data, SMS, SS). Additionally, GSM may also support, various supplementary services that are well-known in the art.

Figure 2A:
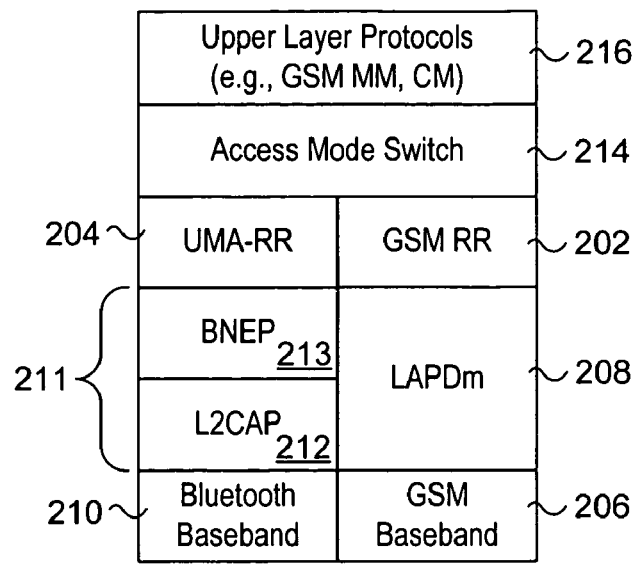
FIG. 2A illustrates an overview of a level 1, level 2, and level 3 GSM-related protocol architecture for one embodiment of a mobile station that provides unlicensed radio links via Bluetooth signaling.

FIG. 2A provides an overview of a level 1, level 2, and level 3 GSM-related protocol architecture for one embodiment of mobile station 102 that provides unlicensed radio links via Bluetooth signaling. As illustrated, there are two logical radio resource (RR) management entities: the GSM RR entity 202 and the UMA-RR entity 204. The protocol architecture includes a GSM baseband level 1 layer 206, GSM level 2 link layer (LAPDm) 208, Bluetooth baseband level 1 layer 210, Bluetooth level 2 layers 211 including a layer 2 connection access procedure (L2CAP) layer 212 and a BNEP layer 213, an access mode switch 214, and upper layer protocols 216. When the mobile station is operating in an UMA mode, the UMA-RR entity 204 is the current "serving" RR entity providing service to the mobility management (MM) sublayer via the designated service access point (RR-SAP). The GSM RR entity is detached from the MM sublayer in this mode. The UMA-RR entity 204 provides a new set of functions, and is responsible for several tasks. First the UMA-RR entity is responsible for discovery of UMA coverage and UMA registration. Second, the UMA-RR entity is responsible for emulation of the GSM RR layer to provide the expected services to the MM layer; i.e., create, maintain and tear down RR connections. In one embodiment, all existing GSM 04.07 primitives defined for the RR-SAP apply. The plug-in of UMA-RR entity 204 is made transparent to the upper layer protocols in this way. Third, a UMA-RR entity 204 module is responsible for coordination with the GSM RR entity to manage access mode switching and handover, as described in further detail in application Ser. No. 10/688,470 referenced above.

Figure 2B:
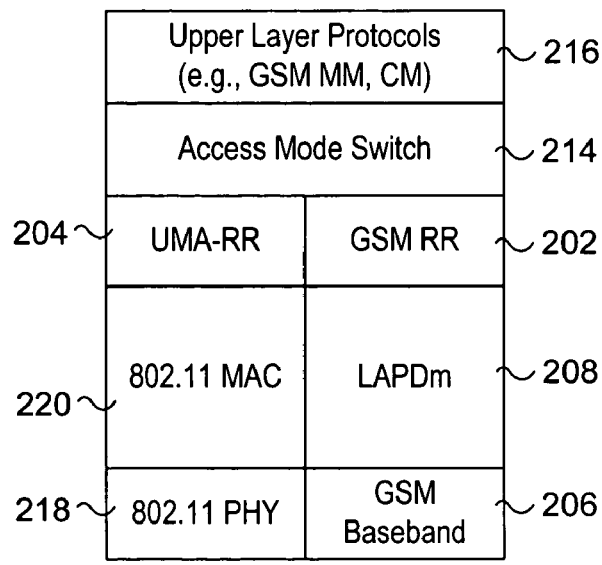
FIG. 2B illustrates an overview of a level 1, level 2, and level 3 GSM-related protocol architecture for one embodiment of a mobile station that provides unlicensed radio links via IEEE 802.11 signaling.

FIG. 2B provides an overview of a level 1, level 2, and level 3 GSM-related protocol architecture for one embodiment of mobile station 102 that provides unlicensed radio links via IEEE 802.11 signaling. All of the entities and layers are the same as described above for FIG. 2A, except that the Bluetooth layers have been replaced with an 802.11 PHY layer 218 and an 802.11 MAC layer 220.

Figure 3B:
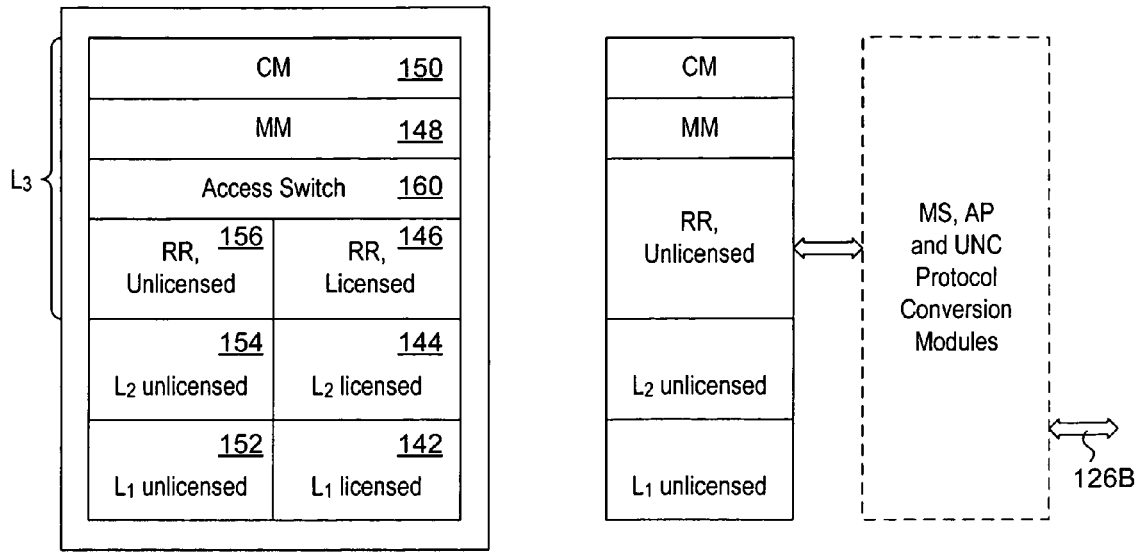
FIG. 3B shows Bluetooth lower layers employed by a mobile station and access point to facilitate physical layer communications.
Figure 3B:
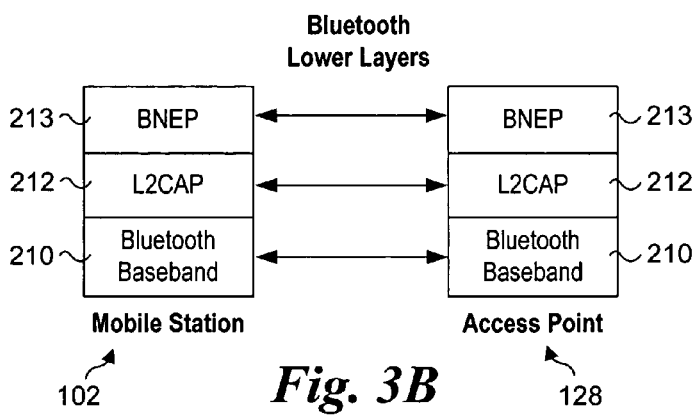
Figure 3C:
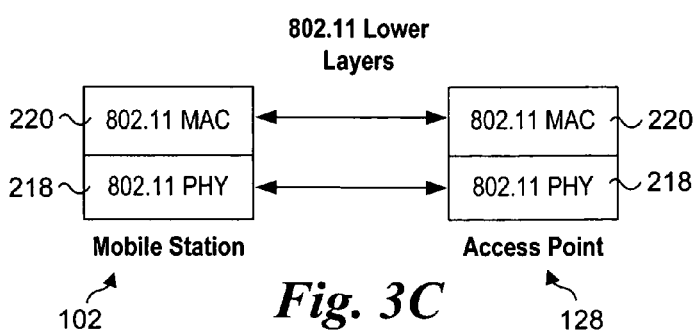
FIG. 3C shows Bluetooth lower layers employed by a mobile station and access point to facilitate physical layer communications.
Figure 3A:
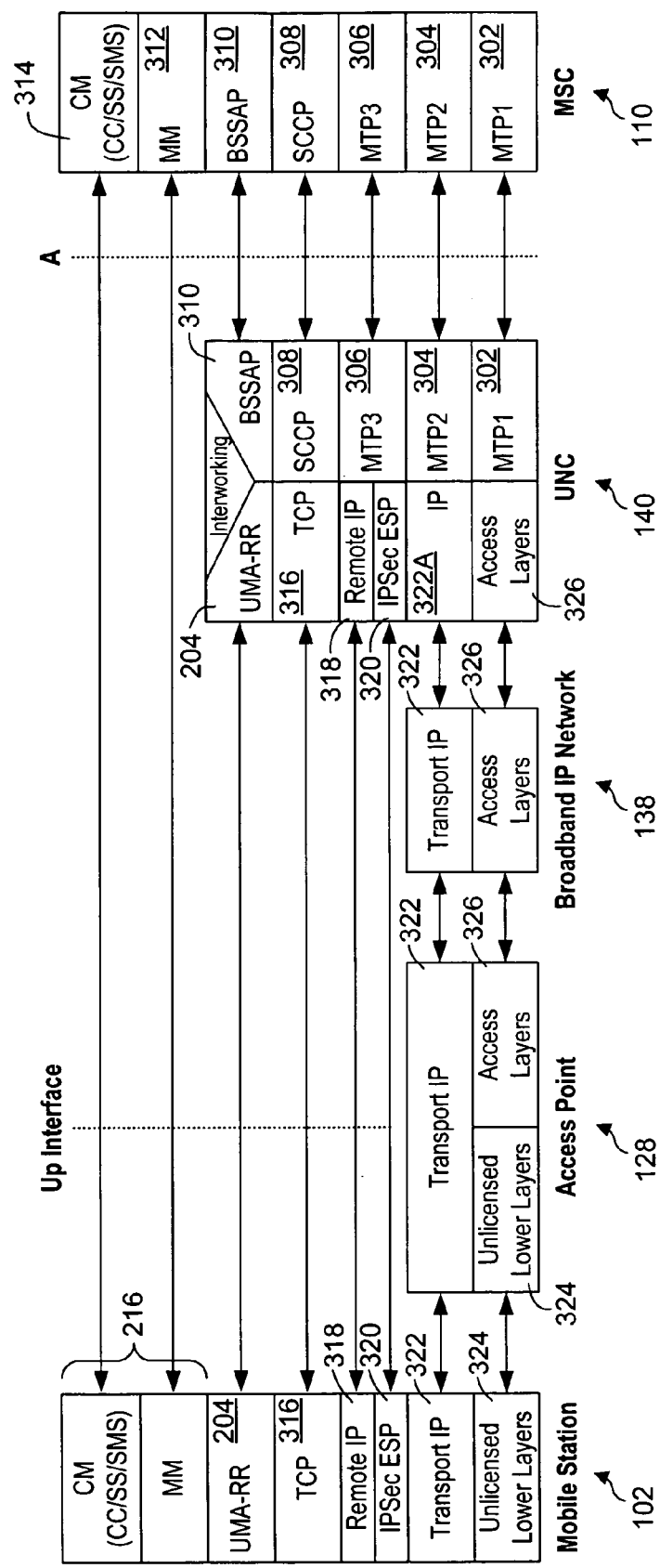
FIG. 3A illustrates the Up interface protocol architecture in support of CS Domain signaling, as well as UMA-specific signaling, according to one embodiment.

FIG. 3A illustrates the Up interface protocol architecture in support of circuit switched (CS) Domain signaling, as well as UMA-specific signaling, according to one embodiment. The MSC sublayers are conventional, well known features known in the art in regards to the message transfer part (MTP) interfaces MTP1 302, MTP2 304, and MTP3 306, signaling connection control part (SCCP) 308, base station system application part (BSSAP) 310, mobility management interface 312, and connection management interface 314.

The UMA-RR protocol supports the UMA "layer 3" signaling functions via UMA-RR layers 204 provided by each of the mobile station 102 and UNC 140. The UNC 140, acting like a BSC, terminates UMA-RR protocol messages and is responsible for the interworking between these messages and the analogous A-interface messages.

The layers below the UMA-RR layer 204 in each of mobile station 104 and UNC 140 include a TCP layer 316, a remote IP layer 318, and an IPSec (IP security) layer 320. As an option, a standard Secure Socket Layer (SSL) protocol running over TCP/IP (not shown) may be deployed in place of IPSec layer 320.

Lower-level IP connectivity between mobile station 102 and UNC 140 is supported by appropriate layers hosted by an intervening access point 128 and broadband IP network 138 (i.e., the access network 138 shown in FIG. 1A). The components for supporting the IP transport layer (i.e., the conventional network layer 3 under the seven-layer OSI model) include a transport IP layers 322 for each of the mobile station 104, AP 128, and IP network 138, and an IP layer 322A at UNC 140.

At the lowest layers (i.e., the physical and data link layers), mobile station 104 and AP 128 are depicted as providing unlicensed lower layers 324, while each of AP 128, IP network 138, and UNC 140 provide appropriate access layers 326. Typically, access layers 326 will include conventional Ethernet PHY and MAC layers (IEEE 802.3), although this is not limiting.

As shown in FIGS. 3A and 3B, the unlicensed layers lower layers 324 will depend on whether the unlicensed radio link uses Bluetooth signaling or IEEE 802.11 signaling. The Bluetooth lower layers depicted in FIG. 3A correspond to the mobile station architecture of FIG. 2A, and include a Bluetooth baseband layer 210, an L2CAP layer 212, and a BNEP layer 213. Meanwhile, the 801.11 lower layers shown in FIG. 3B correspond to the mobile station architecture of FIG. 2B, and include a 802.11 PHY layer 218 and in 802.11 MAC layer 220.

Figure 3D:
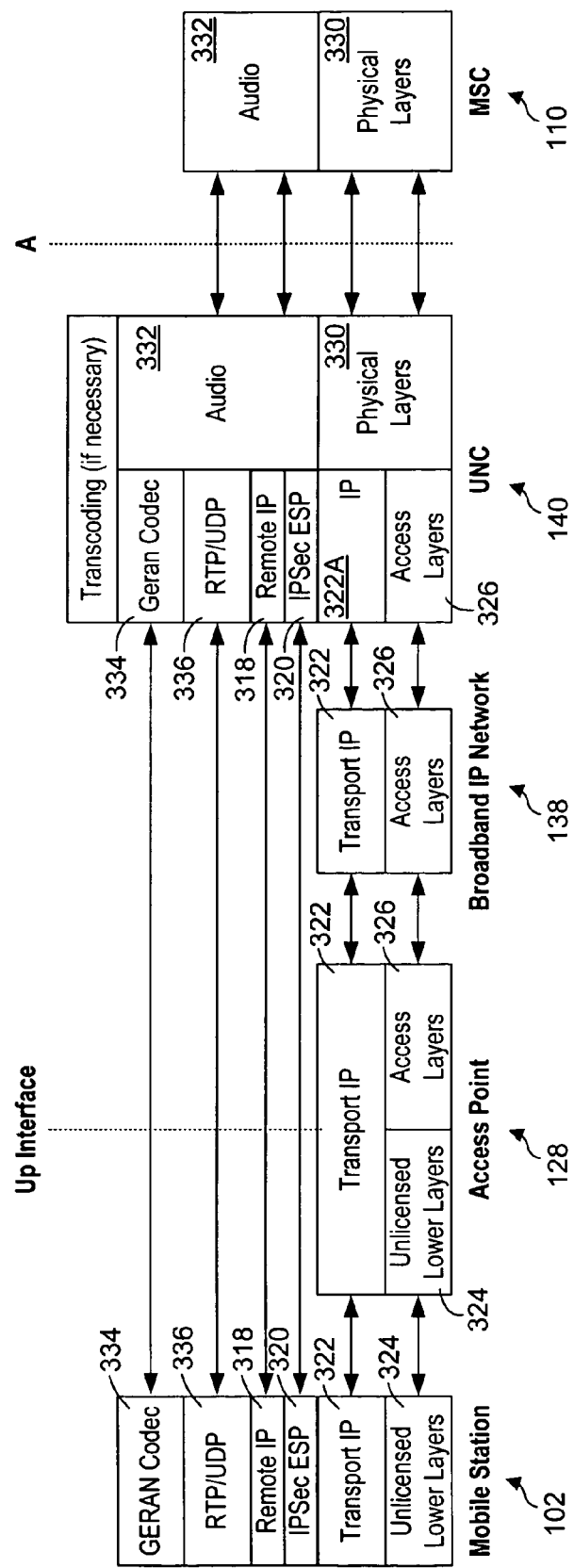
FIG. 3D illustrates the Up CS domain voice bearer protocol architecture in support of GSM voice transmission, according to one embodiment.

FIG. 3D illustrates the Up CS domain voice bearer protocol architecture in support of GSM voice transmission, according to one embodiment. In addition to the like named and referenced components common to the architectures of FIGS. 3D and 3C, facilities are provided for supporting GSM voice transmission. For the MSC 110, these components include conventional components for supporting GSM voice transmissions, and are depicted as physical layers 330 and audio 332, with similar components being deployed in UNC 140. Each of mobile station 102 and UNC 140 now include a GERAN (GSM Edge Radio Access Network) codec 334 and an RTP/UDP layer 336.

Under the architecture of FIG. 3D, audio flows over the Up interface according to the RTP framing format defined in RFC 3267 and RFC 3551. When operating in UMA mode, support for AMR FR as specified in TS 26.103 is supported. Other codecs may also be supported, such as G.711.

Figure 3E:
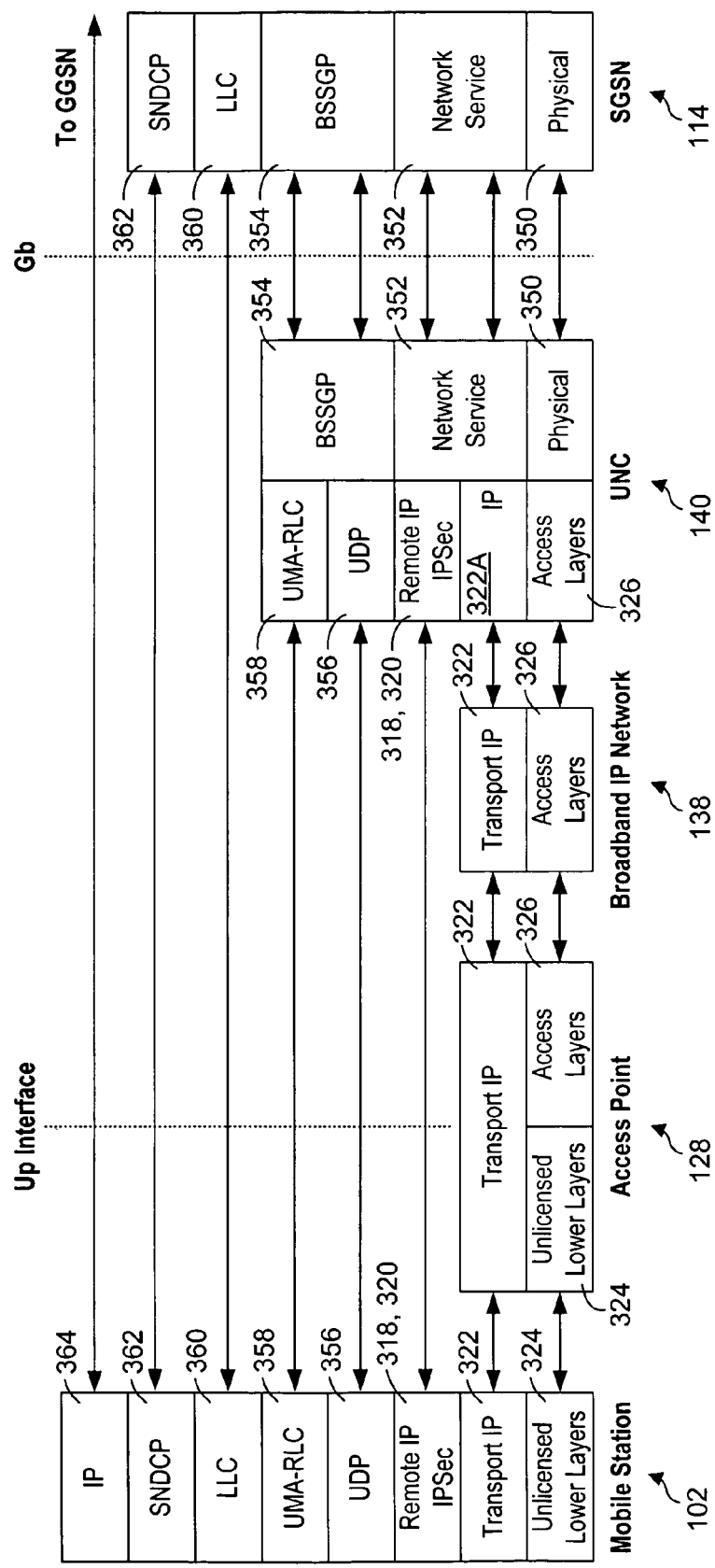
FIG. 3E illustrates the Up GPRS user plane protocol architecture, according to one embodiment.

FIG. 3E illustrates the Up GPRS user plane protocol architecture, according to one embodiment. The Up GPRS user plane protocol architecture effectively enables the tunneling of GPRS signaling and data packets through the UNC 140 utilizing the unlicensed spectrum, thus supporting a tunneling function for packet-switched traffic between the mobile station 102 and SGSN 118.

As illustrated in FIG. 3E, each of the UNC 140 and SGSN 114 employ conventional facilities for supporting GPRS signaling and data packets, including a physical layer 350, a network service layer 352, and a BSSGP layer 354. Each of mobile station 102 and UNC 140 include a UDP layer 356 and a UMA-RLC layer 358. Each of mobile station 102 and SGSN include an LLC layer 360 and an SNDCP layer 362. Mobile station 102 also includes an IP layer 364.

Under the architecture of FIG. 3E, GPRS LLC PDUs carrying data, and higher layer protocols, are carried transparently between the mobile station 102 and SGSN 114. This allows the mobile station to derive all GPRS services in the same manner as if it were in a GERAN BSS. All existing GPRS applications and MMI in mobile station 102 are unchanged. LLC PDUs are carried over UMA-RLC layer 358 from mobile station 102 to UNC 140, which relays the PDUs over to SGSN 114 using BSSGP messaging. The UMA-RLC layer 358 runs directly over the UDP layer 356 to leverage the IP bearer service.

Figure 3F:
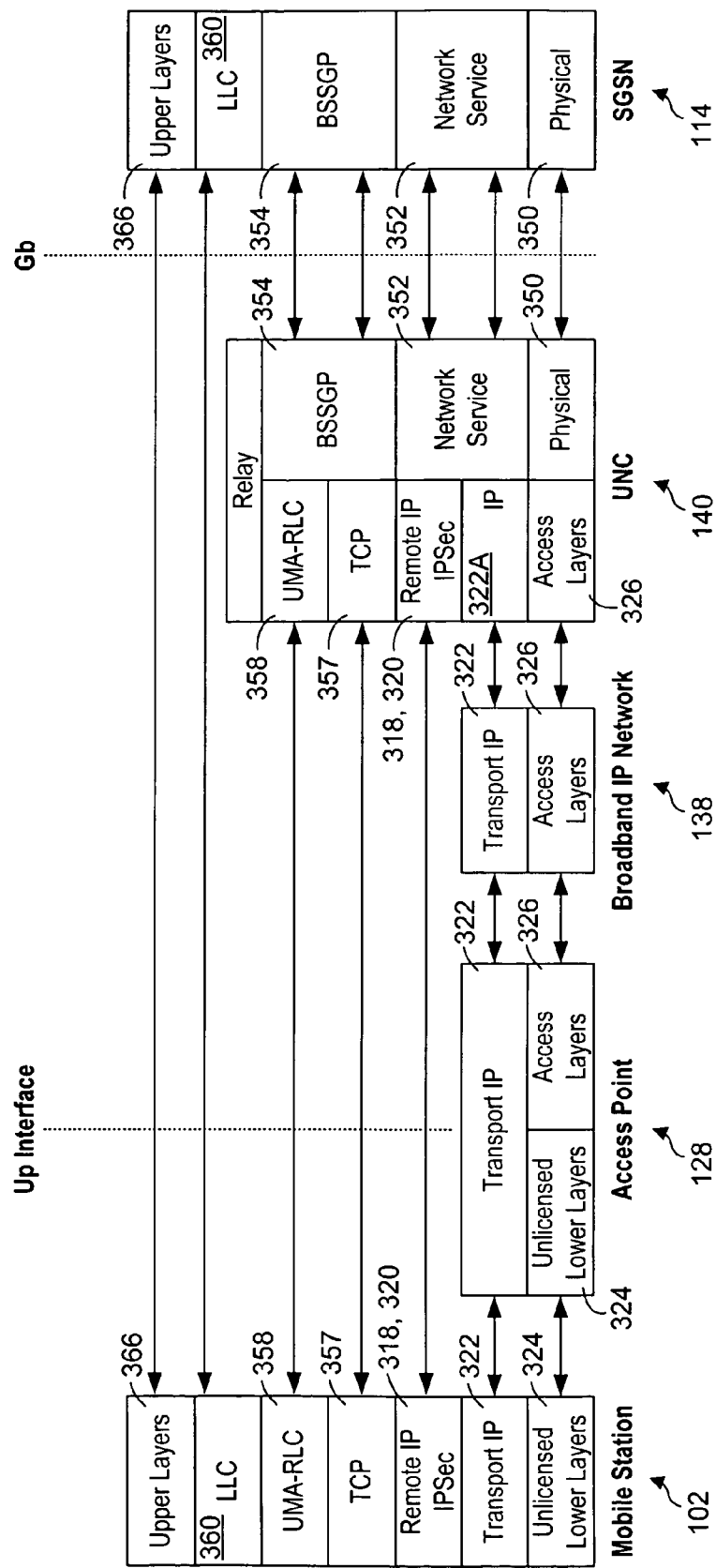
FIG. 3F illustrates the Up protocol architecture in support of GPRS Signaling, according to one embodiment.

FIG. 3F illustrates the Up protocol architecture in support of GPRS Signaling, according to one embodiment. Under this architecture, the GPRS LLC PDUs for signaling an higher layer protocols (including upper layers 366) are carried transparently between MS 102 and SGSN 114. This allows the MS to obtain all GPRS services in the same ways as if it were connected to a GERAN BSS. The GPRS-RLC protocol is replaced with an equivalent (from the upper layer perspective) UMA-RLC protocol. Reliability is ensured by TCP layer 357. As in a GERAN BSS, the UNC, acting like a BSC, terminates the UMA-RLC protocol and inter-works it to the Gb-interface using BSSGP.

As noted above, the mobile station may be, for example, a wireless phone, smart phone, personal digital assistant, or mobile computer. The mobile station may also be, for example, a fixed wireless device providing a set of terminal adapter functions for connecting Integrated Services Digital Network (ISDN) or Plain Old Telephone Service (POTS) terminals to the wireless system.

Other terminal adapter types than those listed above may be employed with embodiments of the present invention. For example: (1) a terminal adapter that supports cordless telephones rather than POTS phones; (2) a terminal adapter that supports standard Session Initiation Protocol (SIP) telephones; and (3) a terminal adapter that also integrates a corded handset and user interface, such as one would find on a desk phone. Representative of the latter type of device is the Phonecell® SX5D Fixed Wireless Phone from Telular Corporation of Chicago, Ill. In each case, the invention described herein describes how these terminal adapter functions can be connected to the wireless system via the unlicensed network.

The use of other standard Bluetooth capabilities together with embodiments of the present invention is possible. For example, there is a Bluetooth standard capability called "SIM Access Profile" that allows one Bluetooth device (e.g., an embedded cell phone subsystem in a car) to access the SIM that is in another Bluetooth device (e.g., the user's normal cell phone), allowing the first device to take on the "personality" associated with the SIM (i.e., that of the user's normal cell phone). The embodiments described above could make use of this standard capability to give the terminal adapter-attached devices (e.g., a POTS phone) the personality of the user's cell phone.

Mobility Management

In one embodiment, and as described in greater detail below, the UNC 140 provides functions equivalent to that of a GSM BSC, and as such controls one or more (virtual) UMA cells. In one embodiment, there may be a single UMA cell per UNC and, in an alternative embodiment, there may be one UMA cell per access point connected to a UNC. The latter embodiment may be less desirable due to the large number of APs expected to be used, so the UMA architecture permits flexible groupings of APs into UMA cells. In one embodiment, each UMA cell may be identified by a cell global identifier (CGI), with an unused absolute radio frequency channel number (ARFCN) assigned to each UMA cell. Each UMA cell may be mapped to a physical boundary by associating it with specific GSM location areas served by the MSC. GSM cells within the location areas mapped to an UMA cell are configured with ARFCN-to-CGI mappings for that UMA cell. Further, this ARFCN may be advertised in the BA list by the GSM cells to permit handovers. Note that UMA cells may use the same location area identifiers (LAI) as existing GSM cells, or a new LAI may be used for UMA cells. The latter is useful in reducing paging in GSM cells when a mobile station is known to be registered via an INC. The above discussion applies equally to GPRS routing areas and routing area identifiers (RAIs).

UMA CPE Addressing

In one embodiment, customer premise equipment (CPE) includes the mobile station and the access point (AP) through which the mobile station may access the UNC for UMA service. UMA CPE addressing parameters may include the parameters described below.

In one embodiment, the UMA CPE addressing includes the international mobile subscriber identity (IMSI) associated with the SIM in the mobile equipment as a parameter. In one embodiment, the IMSI is provided by the UMA mobile station to the UNC when it requests UMA service via the Up interface to the UNC. Unlike the GSM BSC, the UNC manages a context for each mobile station that is operating in UMA mode. Therefore, the UNC maintains a record for each served mobile station. For example, IMSI may be used by the UNC to find the appropriate mobile station record when the UNC receives a BSSMAP paging message.

In one embodiment, the UMA CPE addressing includes the address associated with the unlicensed interface in the mobile equipment (e.g., 802.11 MAC address) as a parameter. This identifier may be provided by the UMA mobile station to the UNC when it requests UMA service via the Up interface. The UNC may use this address as an alternative to the IMSI to limit the transfer of the IMSI over the Up interface and to assist in the routing of messages.

In one embodiment, the UMA CPE addressing includes the temporary logical link identifier (TLLI) assigned to the mobile station by the serving GPRS support node (SGSN) as a parameter. This identifier may be provided via standard Gb-interface procedures. The UNC may track this address for each served mobile station to support GSM Gb-interface procedures (e.g., so that downlink GPRS packets may be routed to the correct mobile station).

In one embodiment, the UMA CPE addressing includes the access point ID (AP-ID) as a parameter. The AP-ID may be the MAC address of the unlicensed mode access point through which the mobile station is accessing UMA service. This identifier may be provided by the UMA mobile station to the UNC when it requests UMA service via the Up interface. In one embodiment, the AP-ID is be used by the UNC to support location services (e.g., enhanced 911 service) to the user based on the AP from which the service is being accessed, as described below in further detail. The AP-ID may also be used by the service provider to restrict UMA service access only to authorized APs.

Other CPE addressing parameters that may be used depend on the security requirements of the Up interface (e.g., the need to manage UMA mobile station IP addresses for message routing via tunneled IPSec connections, or the need to manage local credentials assigned to the mobile station by the UNC).

UMA Cell Identification

In one embodiment, in order to facilitate the mobility management functions in GSM|GPRS, the coverage area is split into logical registration areas called location areas (for GSM) and routing areas (for GPRS). Mobile stations may be required to register with the network each time the serving location area (or routing area) changes. One or more location areas identifiers (LAIs) may be associated with each visited location register (VLR) in a carrier's network. Likewise, one or more routing area identifiers (RAIs) may be controlled by a single SGSN.

In one embodiment, a GSM cell is identified within the location or routing area by adding a cell identity (CI) to the location or routing area identification. The cell global identification (CGI) is the concatenation of the location area identification and the cell identity. In one embodiment, the cell identity is unique within a location area.

An Exemplary UMA Approach to Cell Identification

One embodiment of a UMA cell identification approach is described below. In this embodiment, a single UNC provides service for one or more UMA location areas and one or more UMA routing areas, and each UMA location area (or routing area) is distinct from, or the same as, the location area (or routing area) of the overlapping GSM cell. A UMA cell is identified within the UMA location or routing area by adding a cell identity (CI) to the location or routing area identification. The UMA cell global identification (UMA-CGI) is the concatenation of the location area identification and the cell identity. In one embodiment, a UMA cell may be a pre-defined partition of the overall UMA coverage area identified by a UMA-CGI value. Note that cell identification, like UMA information, may be transparent to the AP, such that the AP is not aware of its associated UMA-CGI value. The UMA components (e.g., mobile station and UNC) may support the ability to partition the overall UMA coverage area.

In one embodiment, a partitioning method may include implementing a one-to-one or a many-to-one correspondence between GSM cell identity and UMA cell identity. Given the identification of a preferred GSM cell in a particular area, it may be possible to determine the corresponding UMA cell identity based, for example, on UNC provisioning. An example of a one-to-one relationship is mapping a GSM cell to a UMA cell. An example of a many-to-one relationship is mapping a GSM location area (and associated GSM cells) to a UMA cell. This may be required for enhanced 911 emergency call routing purposes, as described under "Emergency Services" below.

In one embodiment, when a UMA mobile station connects to the UNC for UMA service, it sends the CGI value and a path loss criterion parameter (C1) of the current GSM camping cell, as well as the neighbor cells, to the UNC. The UNC maps the GSM camping cell's CGI value to a corresponding UMA cell's CGI value based on mapping logic provisioned in the UNC. This may be a one-to-one mapping (e.g., if there is one UMA cell per GSM cell) or a many-to-one mapping (e.g., if there is one UMA cell per GSM location area). If no GSM coverage is available in the UMA service area, the UNC may assign the mobile station to a default "no GSM coverage" UMA cell. A single UNC may serve one MSC. This does not preclude UNC embodiments that combine multiple UNC "instances," as defined above, in a single device. Each UNC may also be assigned a unique "UMA-Handover-CGI" value used for GSM-to-UMA handover purposes. For example, this may be the value provisioned in the GSM RAN BSC's ARFCN-to-CGI tables and in the MSCs (e.g., to point to the UNC).

UMA Operating Configurations

In one embodiment, at least three UMA operating configurations may be identified. In a common core configuration, the UMA LAI and an umbrella GSM RAN LAI (e.g., that serves the subscriber's neighborhood) may be different, and the network may be engineered such that the same core network entities (e.g., MSC and SGSN) serve both the UMA cells and the umbrella GSM cells. One advantage of this configuration is that subscriber movement between the UMA coverage area and the GSM coverage area does not result in inter-system (e.g., MAP) signaling (e.g., location updates and handovers are intra-MSC).

In a separate core configuration, the UMA LAI and umbrella GSM RAN LAI are different, and the network may be engineered such that different core network entities serve the UMA cells and the umbrella GSM cells. One advantage of this configuration is that engineering of the UMA and GSM networks can be more independent than in the Common Core Configuration.

In a common LAI configuration, the UMA LAI and GSM RAN LAI are the same (e.g., different cells within the same LAI). Advantages of this configuration are that subscriber movement (while idle) between the UMA coverage area and the GSM coverage area may not result in any location update signaling, and that the mobile station can easily switch to GSM mode if UMA mode resources are temporarily unavailable (e.g., to respond to paging). Further details of this and the foregoing separate core configuration are discussed in application Ser. No. 10/688,470.

UMA Registration and Deregistration

In one embodiment, as described above, a UMA registration process does not employ signaling to the PLMN infrastructure and is contained within the UMA system (i.e., between the mobile station and UNC). The UMA registration process may serve at least two purposes. It may inform the UNC that a mobile station is connected through a particular AP and is available at a particular IP address. The UNC may keep track of this information, for example, for mobile-terminated calling. The registration process may also provide the mobile station with the operating parameters associated with the UMA service on the AP. This may be analogous to the use of the GSM broadcast control channel (BCCH) to transmit system parameters to mobile stations in GSM cells. GSM system information message content that is applicable in UMA mode may be delivered to the mobile station during the UMA registration process.

Similarly, a UMA deregistration process may allow the mobile station to explicitly inform the UNC that it is leaving UMA mode, allowing the UNC to free resources that it may have assigned to the mobile station. The UNC may also support implicit UMA deregistration, wherein a secure channel to the mobile station is abruptly terminated.

UMA Redirection

In one embodiment, as described above, when a UMA mobile station connects to the UNC for UMA service, it may send a CGI value and a path loss criterion parameter (C1) of the current GSM camping cell, as well as the neighbor cells, to the UNC. Using this information, as well as internal database information, the UNC may be able to determine if it is the correct serving UNC for the mobile station, and if it is not the correct serving UNC, to redirect the mobile station to the correct UNC. The correct serving UNC may be the UNC whose UMA service area overlaps the mobile station's umbrella GSM coverage. In one embodiment, the correct serving UNC might be attached to the same MSC as the GSM BSC to which the umbrella GSM cell belongs. In an alternative embodiment, the correct serving UNC might be attached to a different MSC that may hand-over to the MSC that provides umbrella GSM coverage to the mobile station, allowing the UNC to handover calls to and from GSM. It may also enable certain location-based services (e.g., E911 Phase 1, as described below) that can be tied to the location of the GSM cell. An internal database used by the UNC may map GSM location areas to serving UNCs and conserve the amount of data that needs to be managed. This database may only need to change when a new UNC or a new GSM location area is added.

If no GSM coverage is available when a mobile station connects to the UNC for UMA service, then, under some instances, the UNC may not reliably determine the location of the mobile station for the purposes of assigning the mobile station to the correct serving UNC (e.g., to enable handover and location-based services). The UNC may permit the operator to determine the service policy in this case (e.g., the operator may provide service to the user with certain limitations, possibly with a user interface indication on the mobile station).

UMA Mobile Station Idle Mode Behavior

Figure 4:
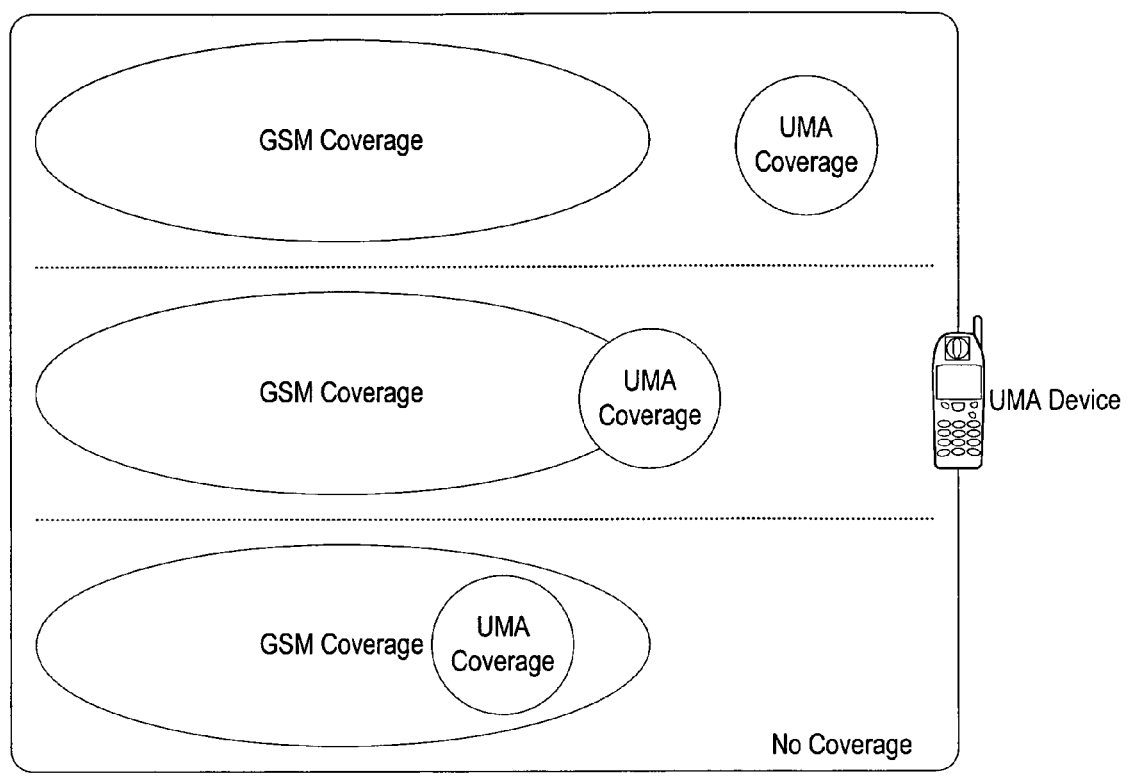
FIG. 4 illustrates several possible GSM and UMA coverage scenarios in accordance with one embodiment.

In one embodiment, as described above, a UMA device may encounter different radio environments as illustrated in FIG. 4. In a first environment, the GSM and UMA coverage areas are completely separate and non-overlapping. In a second environment, the GSM and UMA coverage is partially overlapping. In a third environment, which may be the most common, the UMA coverage is encapsulated within the GSM coverage. A UMA device may power on in any of these environments and further may transition in a number of attached states.

In one embodiment, at power on, and when the mobile station is idle and there is no coverage of any type, the mobile station may scan for both GSM and UMA radio coverage. If GSM coverage is detected, then the normal GSM mobility management procedure may be initiated. This condition may apply when no UMA coverage has been detected by the mobile station when GSM coverage is detected, or prior to the completion of the UMA registration process. If UMA coverage is detected, then the UMA mobile station establishes an unlicensed wireless link (e.g., WLAN link) to the AP and monitors signal quality. When the received signal level at the mobile station passes a predefined threshold, the mobile station performs the UMA registration procedure. Based upon the information returned, the mobile station may determine if a full network registration is required, and if so, what type (e.g., GSM or combined GSM/GPRS). This procedure may apply when no GSM coverage exists or when UMA coverage is detected prior to detecting GSM coverage.

In one embodiment, when the mobile station is idle in GSM coverage, and there is no UMA coverage, the mobile station periodically scans for UMA coverage. If UMA coverage is detected, the mobile station may initiate the UMA registration procedure described above.

In one embodiment, when the mobile station is idle in UMA coverage and there is no GSM coverage, the mobile station continues to perform normal GSM PLMN search procedures. If GSM coverage is detected, the mobile station may send the GSM cell information to the UNC for possible UMA redirection purposes as described above. Alternatively, the mobile station may disable normal GSM PLMN search procedures to conserve power.

In one embodiment, when the mobile station is idle in UMA coverage, and there is GSM coverage, the mobile station may continue to perform normal GSM cell reselection procedures and may store the identification of the selected GSM cell to speed the transition to GSM mode, if required. Alternatively, the mobile station may disable normal GSM cell reselection procedures to conserve power.

In one embodiment, at power off in UMA coverage, a detach indication may be sent by the mobile station to the PLMN via the UMAN (e.g., if required by the PLMN network or normally sent by the mobile station at power off). This indication may be encoded per the current GSM mode of operation (e.g., GSM or GPRS).

In one embodiment, the UMA environment may be an IEEE 802.11 environment. In this case, the mobile station periodically performs an active scan for available 802.11 APs. When an AP is discovered, it may be matched against a stored profile of user preferences and security credentials, in which case the mobile station may automatically associate with the AP. The mobile station may enter low-power sleep mode, waking up periodically to measure signal quality for determining when to trigger UMA registration.

In one embodiment, the UMA environment may be a Bluetooth environment. In this case, the mobile station previously paired with the Bluetooth AP through which it will access UMA service. Periodically, the mobile station may enter a page scan receive mode, and respond to an AP transmit page to establish a link-level connection. Once a link-level control channel is established, and if the mobile station is not otherwise active, it may enter a low-power Bluetooth state (e.g., park mode) to conserve power. Periodically, the AP may poll the mobile station to allow it to re-enter active-power mode. This periodic traffic may also be used by the mobile station to measure signal quality to determine when to perform the UMA registration procedure.

UMA Mobile Station Dedicated Mode Behavior

A UMA device engaged in a voice call, a data transaction or a simultaneous voice/data transaction may encounter a transition from GSM coverage to UMA coverage or a transition from UMA coverage GSM coverage. In one embodiment, when the coverage transitions from GSM to UMA coverage, calls may be handed over transparently between the GSM RAN and the UMAN. In the case of voice, the handover may be accomplished by a handover function. In the case of data, session management controls may provide a common end-user experience to that provided in GPRS. Normal registration actions may occur upon a return to the idle state, if appropriate. In one embodiment, when the coverage transitions from UMA to GSM coverage, calls may be handed over transparently between the UMAN and the GSM RAN. In the case of voice, the handover may be accomplished by a handover function. In the case of data, session management controls may provide a common end-user experience to that provided in GPRS.

Summary of Key Mobility Management Concepts

Figure 5:
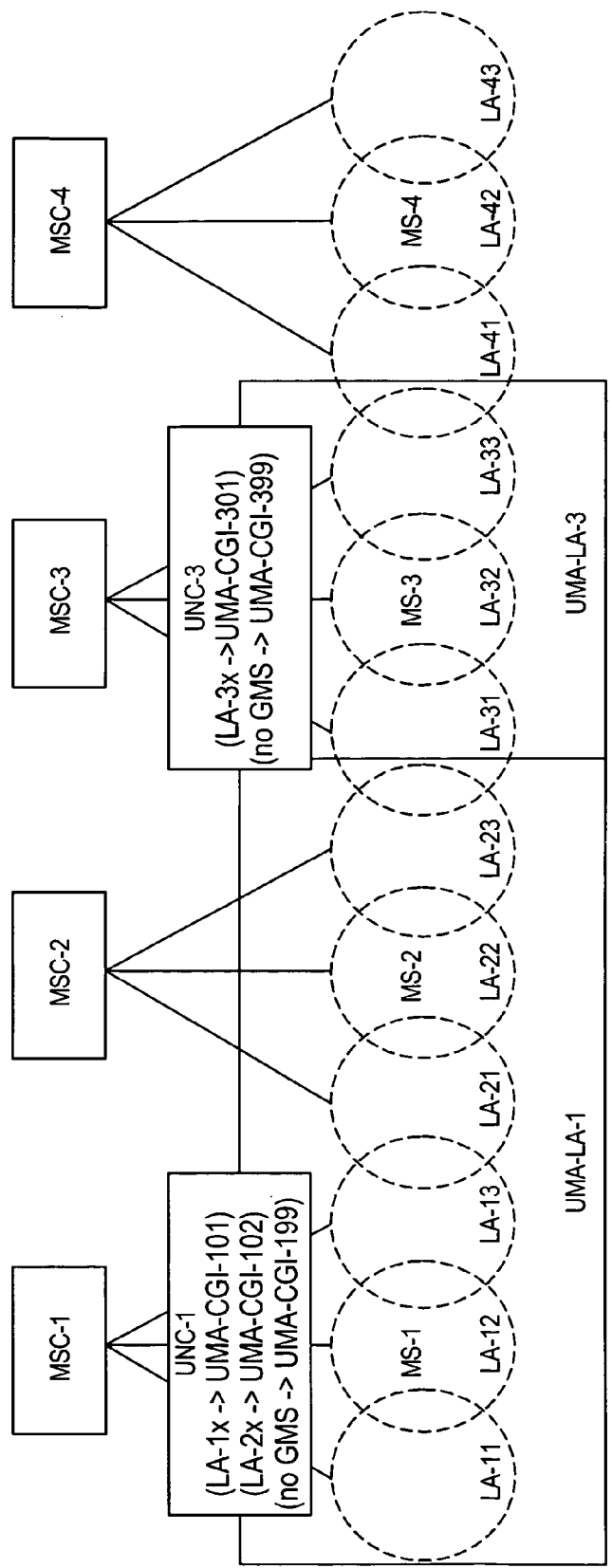
FIG. 5 illustrates exemplary mobility management functions in one embodiment.

FIG. 5 illustrates mobility management functions in one exemplary embodiment. In FIG. 5, unlicensed network controller UNC-1 is the serving UNC for the UMA cells associated with GSM location areas LA-11 to LA-23. UNC-1 maps GSM location areas LA-1*x* to UMA cell UMA CGI-101 and GSM location areas LA-2*x* to UMA CGI-102. Unlicensed network controller UNC-3 is the serving UNC for the UMA cells associated with GSM location areas LA-31 to LA-33. UNC-3 maps GSM location areas LA-3*x* to UMA cell UMA CGI-301. Mobile station MS-1 will be in UMA cell UMA-CGI-101 (since GSM LA-1*x* is mapped to UMA-CGI-101). Mobile station MS-2 will be in UMA cell UMA-CGI-102 (since GSM LA-2*x* mapped to UMA-CGI-102). Mobile station MS-3 will be in UMA cell UMA-CGI-301 (since GSM LA-3*x* mapped to UMA-CGI-301). If mobile station MS-4 connects to UNC-1, it will be in UMA cell UMA-CGI-199 (no GSM coverage). If MS-4 connects to UNC-3, it will be in UMA cell UMA-CGI-399 (no GSM coverage). Mobile stations MS-1 and MS-2 may connect to UNC-1 without redirection. If mobile station MS-3 attempts to connect to UNC-1, it may be redirected to UNC-3.

Location Services for Emergencies and Other Purposes

As described in detail below, location area identification may be used to support UMA-based emergency services. When a wired caller dials 911, the address and phone number of the caller are displayed on a screen at a 911 service center. Enhanced 911 (E911) provides dispatchers with the location of callers and their phone number. This is also known as automatic number information (ANI) and automatic location information (ALI). The FCC has ordered wireless service providers to address the issue in an effort to improve 911 calling from mobile phones.

In phase one of the E911 requirements, wireless service providers are required by the FCC to have the capability to send wireless 911 calls to an E911 public safety answering point (PSAP) containing the location of the cell tower through which the E911 call was processed and the mobile directory number (MDN) or "call back number" of the wireless phone placing the 911 call. In UMA, the emergency call is handled like a normal GSM emergency call origination. The MSC inserts the location identifier into the call signaling to the E911 tandem, the call and location identifier are delivered to the PSAP, and the PSAP uses the identifier to look up the cell site's location in the ALI database. The granularity of the UMA cell may be chosen to allow appropriate PSAP routing and comparable size as a GSM cell (for reasonable location resolution).

In phase two of the E911 requirements, wireless service providers are required by the FCC to have the ability to send the caller's actual location to the E911 PSAP. The location accuracy requirements differ depending on whether a network-based or handset based approach is chosen. The network-based accuracy requirement is within 300 meters 95% of the time and within 100 meters 67% of the time. The handset based accuracy requirement is within 150 meters 95% of the time and within 50 meters 67% of the time. GSM E911 Phase One Solution In one embodiment of a GSM E911 phase one solution, a BSC receives a GSM 04.08 CM service request message that indicates an emergency call establishment request from the mobile station. The BSC forwards the message to the MSC in a GSM 08.08 BSSMAP complete layer 3 information (CL3I) message. The BSC may include the cell global identifier (CGI) associated with the serving cell in the CL3I message. The MSC (or associated emergency services support system) may map the CGI value it receives from the BSC into the Emergency Services Routing Number (ESRN) that is statically associated with the cell. The ESRN may be represented as a 10-digit NANP number, and may also be referred to as the pseudo-ANI, or pANI. The MSC may send the call, with the ESRN, to an E911 tandem switch, which may use ESRN to query a selective routing database to come up with an emergency service number (ESN). The E911 tandem may use the ESN to route the call to the appropriate PSAP, including the calling user's MSISDN in the ISUP calling party number parameter and the ESRN in the ISUP generic digits parameter. The PSAP may use the ESRN to query an ALI database that may return the geographic address associated with the cell.

It will be appreciated by one of ordinary skill in the art that other specific embodiments are possible. In general, the information needed for phase one E911 support is the cell identifier that may be provided by the BSC to the MSC. By a series of transformations in the core network, the cell identifier may be mapped into an ESRN value, which the PSAP may use to query an ALI database to determine the geographic location information associated with the cell.

UMA Solution for E911 Phase One

In one embodiment, UMA elements (e.g., mobile station and UNC) may be transparent for E911 calls that require phase one location. In one embodiment, the call may be handled like a normal emergency call origination. The MSC inserts the UMA cell's location identifier (ESRN) into the call signaling to the E911 tandem, the call and location identifier may be delivered to the PSAP, and the PSAP may use the identifier to look up the cell site's location in the ALI database. In one embodiment, a UMA cell may be defined to encompass a set of GSM location areas belonging to the MSC to which a UNC is attached. However, the serving area of the resulting UMA cell may be too large to provide reasonable granularity for emergency services. For example, if the UMA cell is sufficiently large, it may map to more than one PSAP, which may complicate PSAP routing.

The partitioning of a physical UMA coverage area associated with a UNC, into multiple UMA cells, is described above under mobility management. As described therein, when a UMA mobile station connects to the UNC for UMA service, it may provide the GSM cell information to the UNC. The UNC may then map the GSM cell information to a corresponding UMA cell's CGI value. This may be a one-to-one mapping (e.g., if there is one UMA cell per GSM cell) or a many-to-one mapping (e.g., if there is one UMA cell per PSAP routing area or one UMA cell per GSM location area). If no GSM coverage is available in the UMA service area, the UNC assigns the mobile station to a default "no GSM coverage" UMA cell, subject to refinement based on AP location information, that may be provided for E911 phase two purposes, as described below. The UNC may provide the UMA CGI to the MSC during call establishment, including an emergency call. The MSC (or associated emergency services support system) may map the UMA CGI value into an ESRN value that may be statically associated with the cell, and that has an entry in the ALI database. For example, if there is one UMA cell per GSM cell, then the ESRN for the existing GSM cells is reused and no new ALI database records are needed. In one embodiment, partitioning of the UNC coverage area into UMA cells may be eliminated if the UNC supports E911 phase two and the core network emergency services support systems can map the provided latitude/longitude to a geographic address that can be looked up in the ALI database by a phase one PSAP.

GSM E911 Phase Two Requirements

Figure 6:
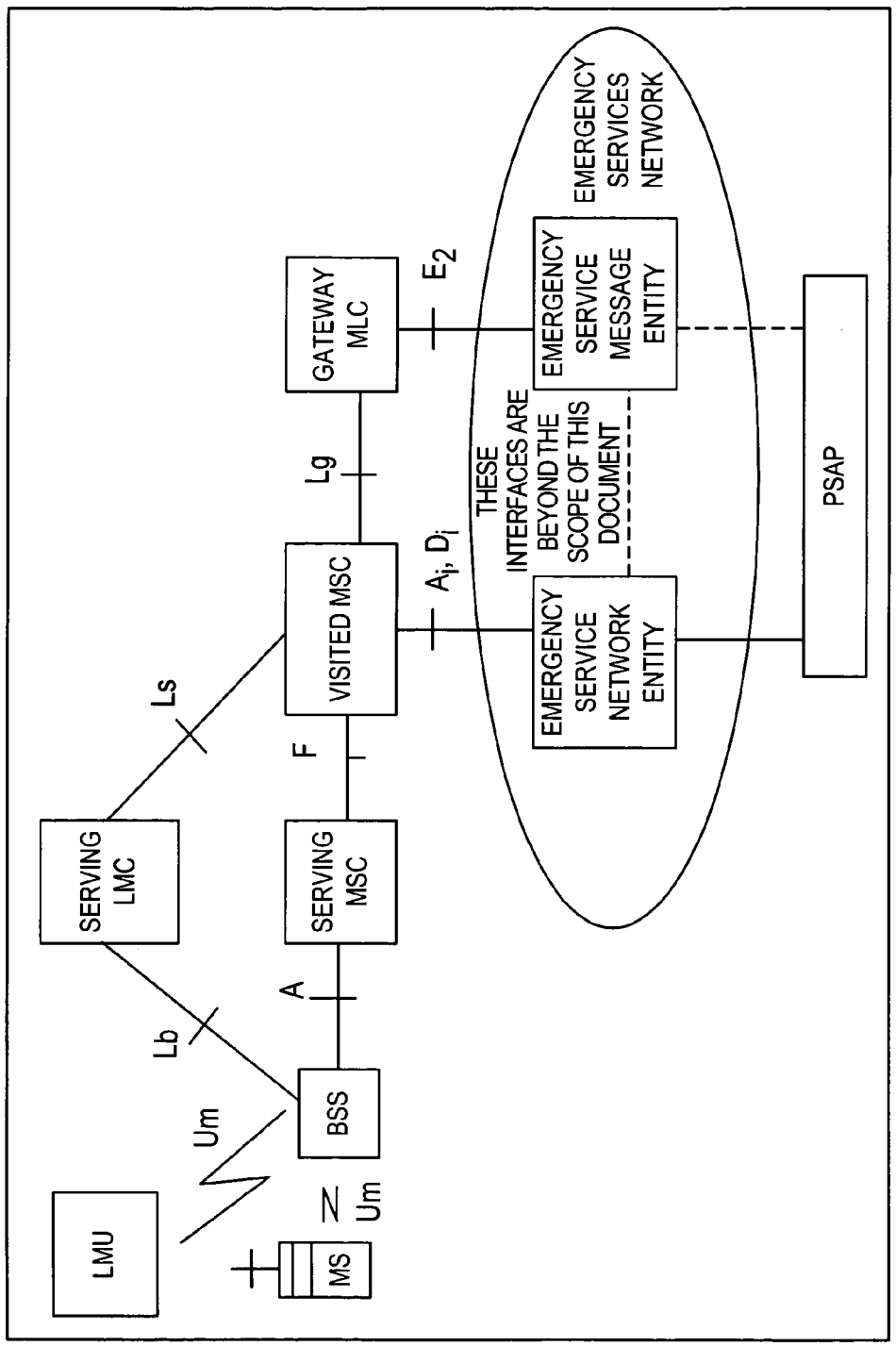
FIG. 6 illustrates a reference model for enhanced emergency service support in accordance with one embodiment.

A GSM 1900 approach to E911 phase two support is defined in J-STD-036-A, "Enhanced Wireless 9-1-1, Phase 2." The condensed network reference model is illustrated in FIG. 6 and described below. The Base Station Subsystem (BSS) receives the emergency call from the mobile station and notifies the visited MSC (VMSC). The BSS is also involved in the handling of certain positioning procedures. The emergency services message entity (ESME) routes and processes the out-of-band messages related to emergency calls. This may be incorporated into selective routers (also known as routing, bridging and transfer switches) and automatic location information (ALI) database engines. The emergency services network entity (ESNE) routes and processes the voice band portion of the emergency call. This is composed of selective routers (also known as routing, bridging and transfer switches). The gateway mobile location center (GMLC) contains functionality required to support delivery of a mobile's position to the ESME. The GMLC handles requests for a mobile's initial, updated (current) or last known position from the ESME. In one PLMN, there may be more than one GMLC. The GMLC sends positioning requests to and receives final position estimates from the visited MSC via the Lg interface. The GMLC stores the initial position estimate to support a non-call associated signaling (NCAS) pull operation (when the ESME requests the position from the GMLC). The serving mobile location center (SMLC) manages the overall coordination and scheduling of resources required to determine a mobile's position. For some position methods, it also calculates the final position estimate and accuracy. In one PLMN, there may be more than one SMLC. As described in 3GPP TS 03.71, two types of SMLC are possible; NSS based SMLC, which supports the Ls interface, and BSS based SMLC, which: supports the Lb interface. An NSS based SMLC supports positioning of a target mobile station via signaling on the Ls interface to the visited MSC. A BSS based SMLC supports positioning via signaling on the Lb interface to the BSC serving the target mobile station. Both types of SMLC may support the Lp interface to enable access to information and resources owned by another SMLC. A location measurement unit (LMU) makes radio measurements to support the determination of a mobile's position. All position and assistance measurements obtained by an LMU are supplied to a particular SMLC associated with the LMU. The procedures associated with location determination for emergency service purposes are described in 3GPP TS 03.71.

UMA Solution for E911 Phase Two

Unlike with GSM networks, the base station equivalents (APs) are not centrally managed by a service provider. In fact, under anticipated implementations of some of the embodiments of the UMA technology discussed herein, the APs are completely unaware of their even being used as an AP for UMA services, e.g., a mobile station simply appears as another WLAN client. Nor do all access models for UMA services necessitate the particular AP be identified beyond the IP address of the AP. Further yet, in some implementations the IP address of the AP does not need to be revealed to the UMA service provider, only the identification of the mobile station needs to be identified.

Consider the following analogy. Under a conventional IP network, data is routed between endpoints via various routing devices (switches, routers, bridges, etc.). The particular routing devices need not be identified to route messages—unless schemes such as source routing are used, the particular route will be dynamically determined by the routing devices at the time the message is forwarded. A similar situation may occur under some implementations of UMA service. As discussed above with respect to the architectures of FIGS. 3A, 3D, and 3E, an access network (comprising a broadband IP network in one embodiment) sits between a UNC and a mobile station. Furthermore, in some embodiments the access point merely serves as a wireless extension to the access network. As such, the access point functions as an intermediary routing device, and thus need not be identified to route data between a mobile station and a UNC. Furthermore, it is anticipated that subscribers may access the UMA network infrastructure via their own personal access points (e.g., a WAP on a home network). As a result, if the user moves the access point as a result of a family move, choose to move the access point from a home network to an office network or vice versa, etc., any location information the user had previously entered for the access point with his or her UMA or GSM service provider will no longer be valid. Thus, identifying the location of a mobile station accessing UMA services may presents some difficulties under various circumstances.

In one embodiment of a UMA solution for E911 Phase Two, the UNC determines location information for the AP that the mobile station uses to access the UMA service. When the UMA mobile station performs the UMA registration procedure described above, one of the parameters that the UNC provides to the mobile station in the response may be a "location available" indicator. If the UNC does not have a location estimate (i.e., latitude and longitude) for the AP, then the indicator is set to "no location is available." Otherwise, the indicator is set to "location is available". "No location is available" would typically be the case the first time the UMA mobile station connects to the UNC for service. In that case, the user may be informed of the setting of the "location available" indicator via a user interface icon on a display screen in the mobile station. The mobile station may provide a convenient way for the user to access an "enter UMA location" function. Invocation of this function may enable the user to enter street address information associated with the current location. Once entered, the mobile station may send this information to the UNC. The UNC may process the information (e.g., performs a geocoding operation) to attempt to derive a location estimate. If this procedure results in the creation of a location estimate for the AP, then the UNC may store this information in a corresponding AP record, which may also include the AP-ID. When a location estimate is added to an AP record, and the associated AP is serving one or more UMA mobile stations, the UNC may send a message to each mobile station with the location available indicator set to the value "location is available." The user may be informed of the change in the setting of the "location available" indicator via a change to the user interface icon on the mobile station display screen. The description above is for an embodiment involving user-entered AP address information.

In another embodiment, the WLAN access network supports new location capabilities (e.g., those based on DHCP GEOPRIV extensions, as described in IETF Internet Draft: "draft-ietf-geopriv-dhcp-civil-01") that provide the street address or geographic location of the AP to the mobile station, and the mobile station may pass this information to the UNC when it connects for UMA service. In one embodiment, the mobile station contains GPS technology that may allow it to acquire a position estimate, which it may pass to the UNC when it connects for UMA service. Once the location information associated with the serving AP is stored in the UNC, E911 phase two location queries may be handled. In one embodiment, from the core network's perspective, the UNC may provide a BSS-based, serving mobile location center (SMLC) function. When there is a need for phase two location, the MSC may send a BSSMAP Perform Location-request message to the UNC. The UNC may retrieve the AP's location information and respond with a BSSMAP perform-location-response message containing the location estimate. In one embodiment, it may be an operator option to configure the UMA service such that emergency calls are made via GSM mode if "no location is available". This option may be configured in the UNC and the UNC may include this configuration setting in the UMA operating parameters sent to the mobile station during the UMA Registration process.

Figure 7:
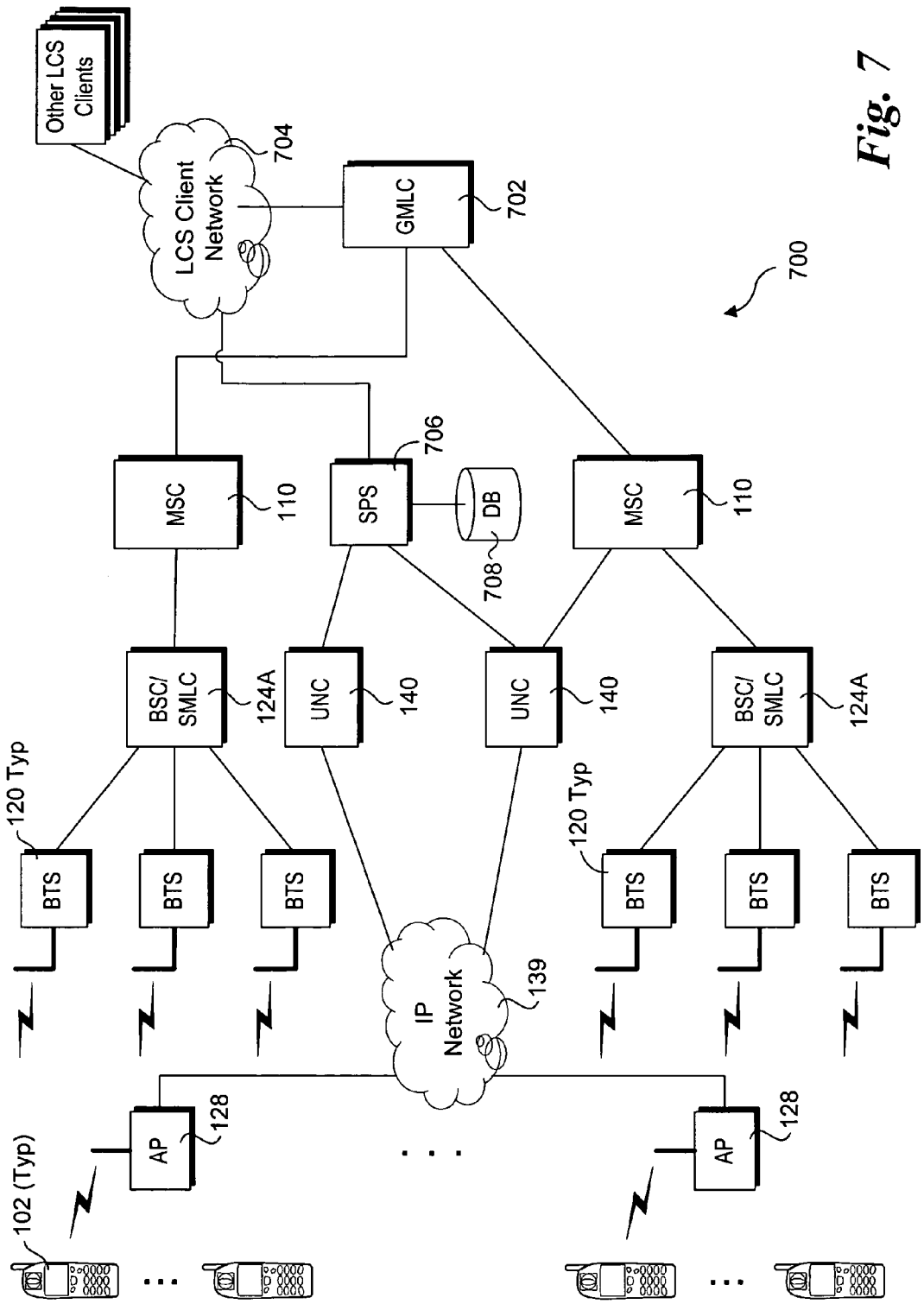
FIG. 7 illustrates a system architecture to support UMA location services via GSM location service infrastructure, according to one embodiment.

In another embodiment, location information for supporting a UMA solution for E911 Phase Two leverages locator infrastructure common to GSM networks. An exemplary network architecture 700 for implementing this technique is shown in FIG. 7. Network architecture 700 includes various instances of the UMA elements discussed above, including mobile stations 102, access points 128, an IP network 139, a pair of exemplary UNCs 140, and a pair of exemplary MSCs 110. A respective BSC 124A with an integrated serving mobile locating center (SMLC) is connected to each of the MSCs 110. In turn, each BSC 124A manages a set of BTSs 120. In an optional configuration, one or more of the SMLCs may be implemented as separate elements (i.e., not integrated with an BSC).

In addition to the aforementioned components, network architecture 700 further includes a gateway mobile locating center (GMLC) 702, a location services (LCS) client network 704, a service provisioning server (SPS) 706, and an SPS database 708. The SMLCs and GMLC 702 represent conventional infrastructure employed by GSM networks for performing location services, and function in a manner similar to that described above. The SPS 706 is employed for provisioning UMA services for one or more service providers. In one embodiment, an SPS is co-located with a UNC or physically integrated in a UNC. In another embodiment, multiple UNCs share access to a common SPS, and are connected to such an SPS via a high speed access link, such as a Ethernet connection, private trunk, VPN tunnel, or a leased line hosted by public network infrastructure. SPS database 708 is used to store UMA service data, such as subscriber data, mobile station identifiers and capabilities, access point information, security data, etc.

Figure 8:
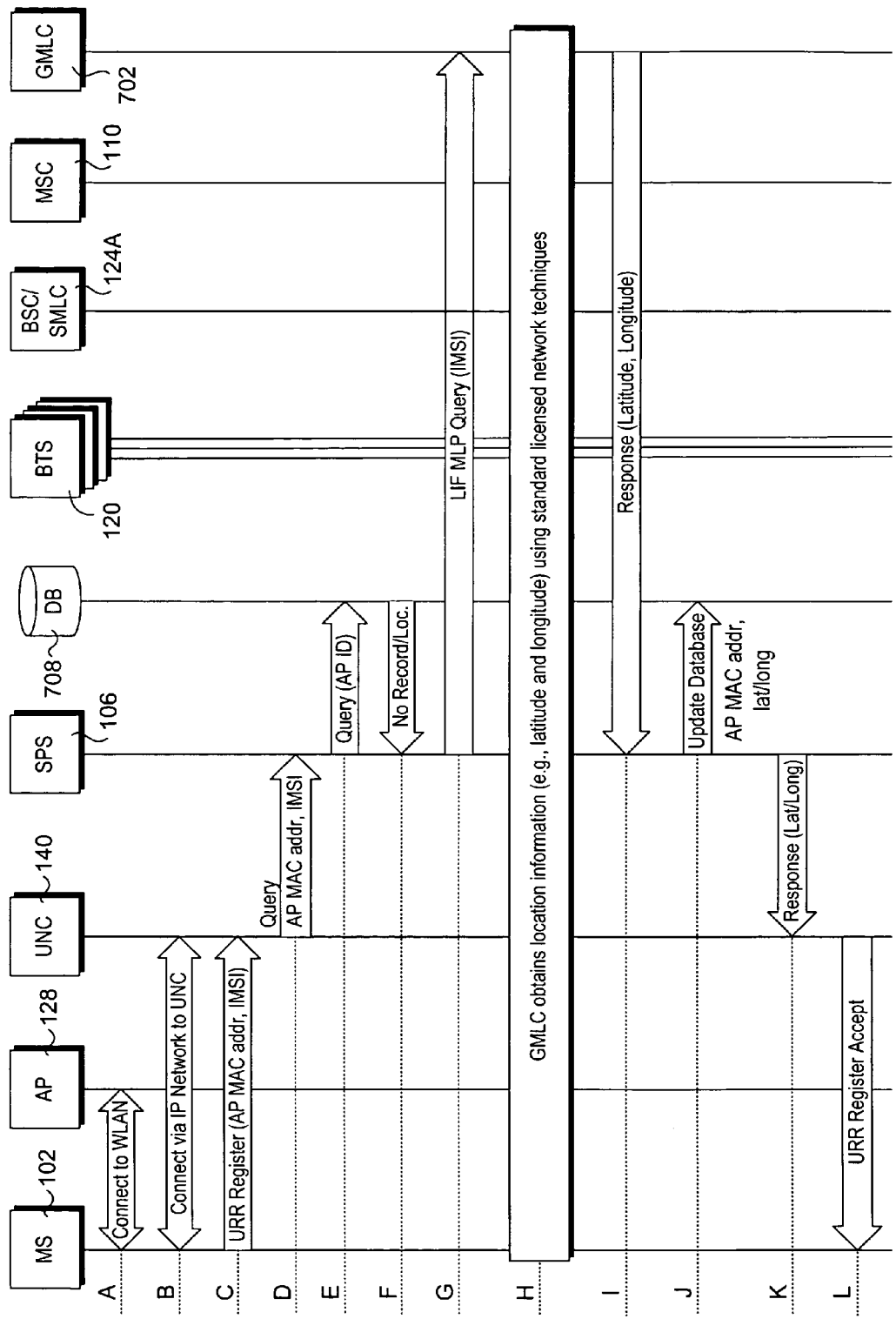
FIG. 8 is a message and data flow diagram illustrating messages and operations employed to facilitate location of a UMA subscriber, according to one embodiment.

One embodiment of a message and operation sequence for locating a UMA subscriber using network architecture 700 is shown in FIG. 8. The sequence begins at step A, with MS 102 establishing an unlicensed wireless link with AP 128. Next, at step B, MS 102 connects via AP 128 and an IP network (not shown) to UNC 140. Then, at step C, MS 102 sends a URR (UMA Radio Resource) Register Request message that includes the AP MAC address and the IMSI for MS 102 to UNC 140. In response, UNC 140 forwards the AP MAC address and the MS IMSI to SPS 706 at step D.

In one embodiment, the AP MAC address is used as an AP identifier (AP ID). Accordingly, at step E, SPS 706 queries SPS database 708 using the AP ID to determine if there is a record in the database that identifies the location of the AP. If there is, the location information is returned. However, for the purpose of illustration, it will be presumed that no such record initially exists. In this instance, SPS database 708 would return a no record or location message to SPS 706 at step F.

In response to determining that no location data for the AP exists, the SPS initiates a location service requests to applicable location service infrastructure. In the illustrated embodiment, SPS 706 submits a Location Inter-operability Forum Mobile Location Protocol query (LIF MLP) including the IMSI for MS 102 at step G. The LIF TS 101 Specification (Version 3.0.0 6 Jun. 2002) defines a secure access method via an Application Program Interface (API) that enables Internet applications to query location information from wireless networks, irrespective of its underlying air interface and positioning methods. The API is based on existing and well-known Internet technologies, such as HTTP, SSL/TLS and XML. The GMLC functions as a gateway server for location services, and hosts an instance of the LIF API. Accordingly, the SPS and the GMLC may perform an authentication message exchange to verify the UNC is authorized to use location services accessed via the GMLC.

Once the authorization is verified, the GMLC obtains location information corresponding to the request using standard licensed network techniques at a step H. These include, but are not limited to, Assisted GPS (AGPS), Angle of Arrival (AOA), Enhanced Observed Time Difference (E-OD), Cell Identity plus Timing Advance (Cell ID+TA), and Time Difference of Arrival (TDOA).

In response to obtaining the location information, GMLC 702 returns the location information to SPS 706 at step I. The SPS then updates or creates a new location record for the serving AP (e.g., AP 128) for the MS in SPS database 708 at step J. In essence, the location of the AP is considered to be the same as the location information calculated for the mobile station accessing the AP. For typical 802.11 and Bluetooth networks, the maximum location error relative to the calculated MS location (which has some accuracy limitations on its own in view of the location technique being employed) will be the range of coverage provided by the access point.

In conjunction with the foregoing operations at step K, a response message containing the location of the AP is returned to UNC 140, which may store the location information in a local data store. UNC 140 then returns a URR Register Accept message to MS 102 at step L. This completes the registration process and the location sequence.

Figure 9A:
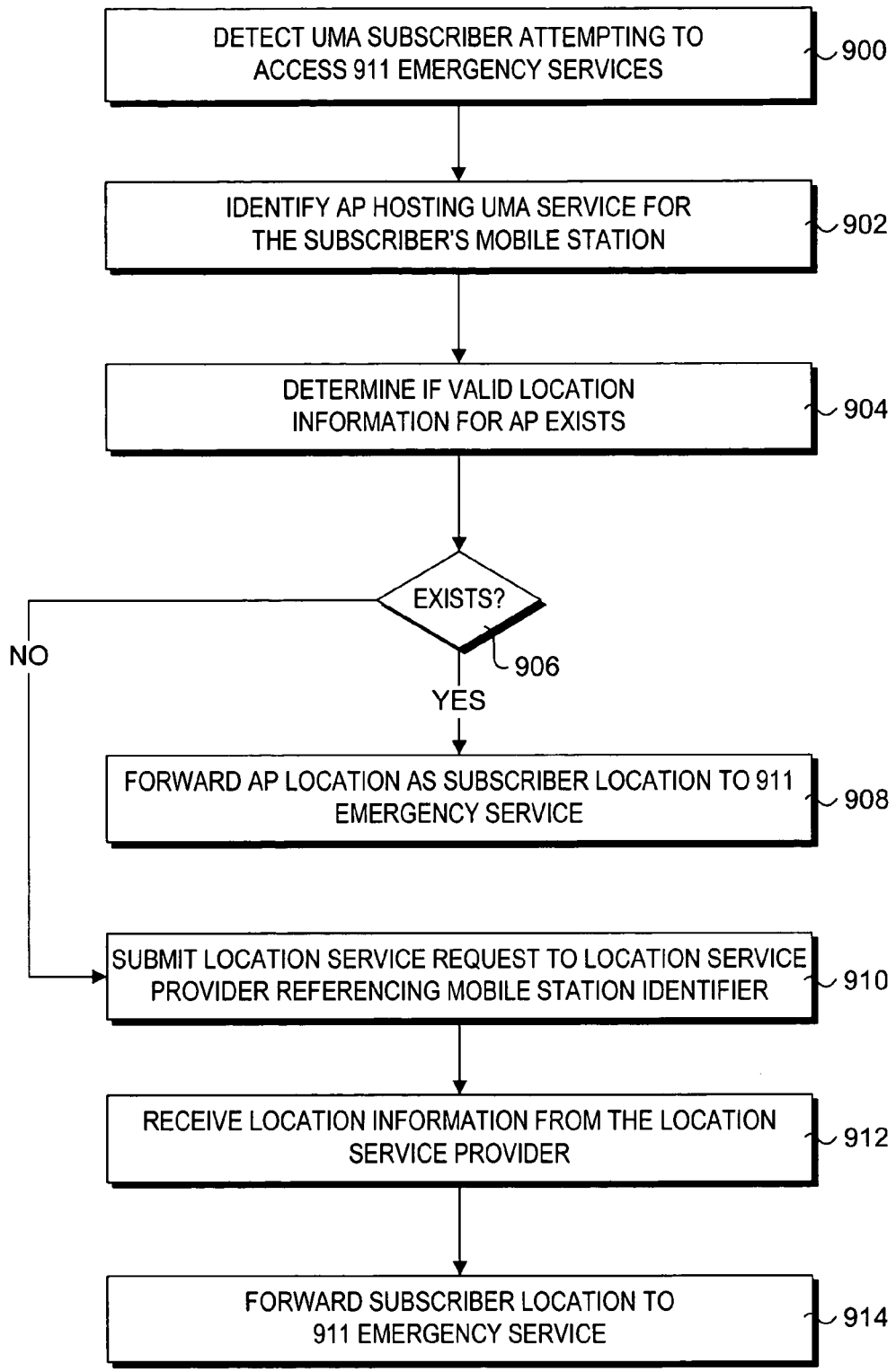
FIG. 9A illustrates operations and logic to support emergency location services via a UMA session, according to one embodiment.

The flowchart of FIG. 9A illustrates operations and logic to support emergency location services via a UMA session, according to one embodiment. The process begins in a block 900, wherein an attempt to access 911 emergency services via the subscriber's mobile station is detected. For instance, in this instance the mobile station will be operating in a voice communication compatible mode, wherein the MS provides functionality similar to that used when operating in a licensed wireless network session. The subscriber will thus dial 911, and attempt to place the call. Corresponding information will be generated by the MS and forwarded to the UNC. The UNC will trap such calls, and perform the remaining operations shown in FIG. 9A.

In a block 902, the AP hosting the UMA service for the subscriber's MS will be identified. Then, in a block 904, a determination will be made to whether the UNC (or UNC operator) has any valid location information for the AP (e.g., by a SPS lookup or by a lookup in a local data store). As depicted by a decision block 906, if such a record exists, the AP location will be forwarded to the 911 emergency service as the location for the subscriber. If no record is found, the UNC will submit a location service request to the location service provider referencing an identifier for the MS in a manner similar to that discussed above for FIGS. 7 and 8. In response, location information for the MS will be received from the location service in a block 912, and the MS location information will be forwarded as the subscriber location to the 911 emergency service in a block 914.

Figure 9B:
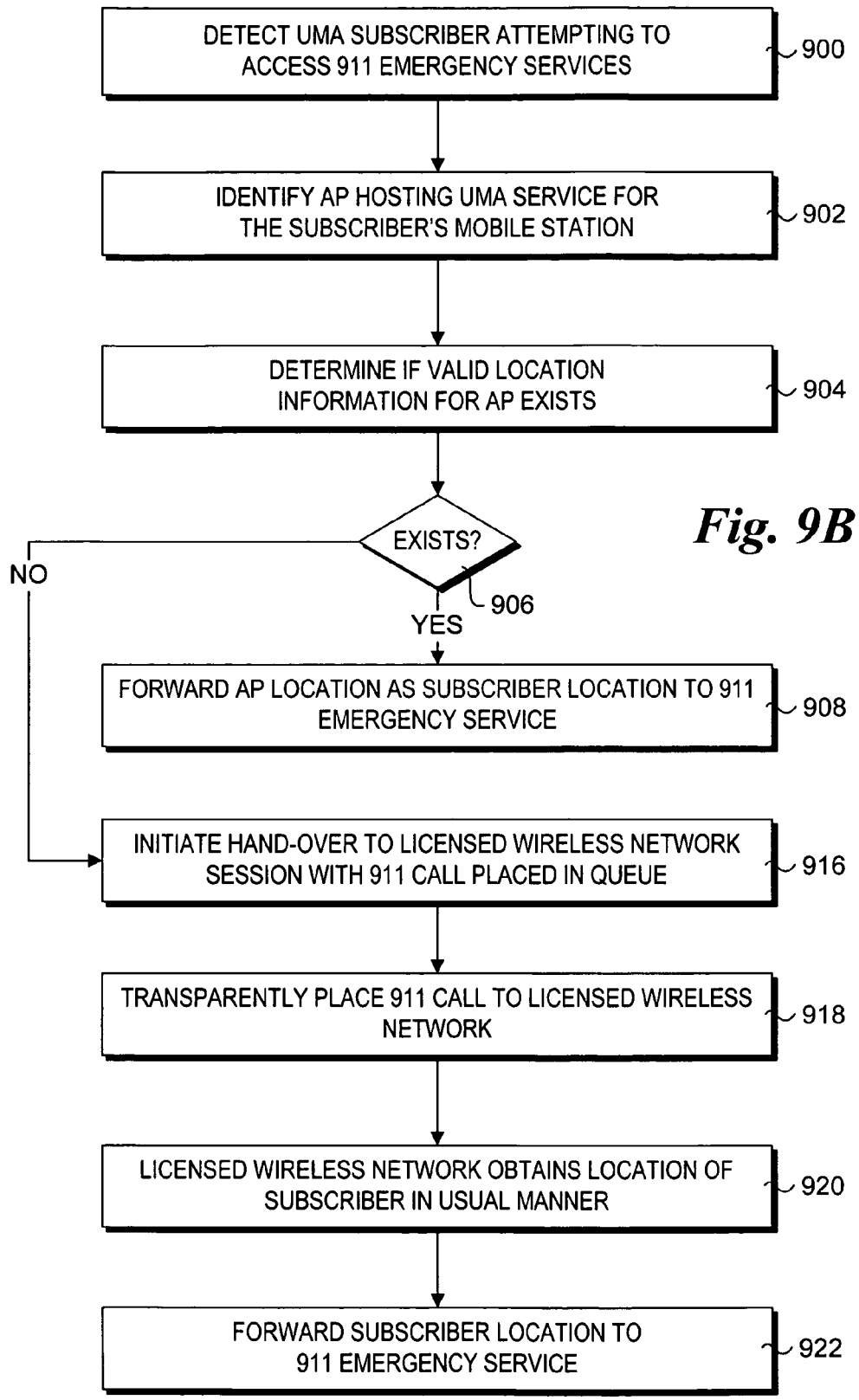
FIG. 9B illustrates operations and logic to support emergency location services via a UMA session, according to another embodiment.

An alternate scheme for supporting 911 emergency service location information from a 911 call initiated during a UMA session in shown in FIG. 9B. The operations up to block 908 are the same as those employed by the embodiment of FIG. 9A. However, in this embodiment, a NO answer to decision block 906 causes a hand-over from the UMA session to a licensed wireless network session to be initiated in a block 916. Furthermore, the 911 call is placed in the session queue, such that when the licensed wireless network session is established, a 911 call is transparently placed (i.e., the subscriber doesn't have to redial the number) to the licensed wireless network, as depicted by a block 918. The licensed wireless network then obtains the location of the subscriber in its usual manner in a block 920, and the subscriber location information is forwarded to the 911 emergency service in a block 922.

It will be understood that an embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

APPENDIX I

Table Of Acronyms

| | |
|---|---|
| AP | Access Point |
| ARFCN | Absolute RF Channel Number |
| ATM | Asynchronous Transfer Mode |
| ATM VC | ATM Virtual Circuit |
| BA | BCCH Allocation |
| BAS | Broadband Access System |
| BB | Broadband |
| BCCH | Broadcast Common Control Channel |
| BRAS | Broadband Remote Access System (e.g., Redback Networks SMS) |
| BSC | Base Station Controller |
| BSS | Base Station Subsystem |
| BSSGP | Base Station System GPRS Protocol |
| BSSMAP | Base Station System Management Application Part |
| BTS | Base Transceiver Station |
| CDMA | Code Division Multiple Access |
| CGI | Cell Global Identification |
| CIC | Circuit Identity Code |
| CLIP | Calling Line Presentation |
| CM | Connection Management |
| CPE | Customer Premises Equipment |
| CS | Circuit Switched |
| CVSD | Continuous Variable Slope Delta modulation |
| DSL | Digital Subscriber Line |

APPENDIX I-continued

Table Of Acronyms

| | |
|---|---|
| DSLAM | DSL Access Multiplexer |
| DTAP | Direct Transfer Application Part |
| ETSI | European Telecommunications Standards Institute |
| FCAPS | Fault-management, Configuration, Accounting, Performance, and Security |
| FCC | US Federal Communications Commission |
| GGSN | Gateway GPRS Support Node |
| GMM/SM | GPRS Mobility Management and Session Management |
| GMSC | Gateway MSC |
| GSM | Global System for Mobile Communication |
| GPRS | General Packet Radio Service |
| GSN | GPRS Support Node |
| GTP | GPRS Tunnelling Protocol |
| HLR | Home Location Register |
| IAN | Indoor Access Network (see also UMA Cell) |
| IAN-RR | Indoor Access Network Radio Resource Management |
| IBS | Indoor Base Station. The indoor base station is the fixed part of the customer premise solution. The indoor base station provides indoor unlicensed wireless coverage, and connects to the access network to enable indoor service delivery. An IBS can be a single access point, or a set of access points with a centralized controller |
| IBSAP | IBS Application Protocol |
| IBSMAP | IBS Management Application Protocol |
| IEP | IAN Encapsulation Protocol |
| IETF | Internet Engineering Task Force |
| IMEI | International Mobile Station Equipment Identity |
| IMSI | International Mobile Subscriber Identity |
| INC | Indoor Network Controller |
| INC | Indoor Network Controller (also referred to as a UMA Network Controller (UNC)). The indoor network controller is the component of the IAN network equipment that manages the indoor access network, and provides the physical layer interface(s) to the access network. |
| IP | Internet Protocol |
| ISDN | Integrated Services Digital Network |
| ISP | Internet Service Provider |
| ISP IP | Internet Service Provider's IP Network (i.e., typically provided by broadband service provider) |
| IST | IAN Secure Tunnel |
| ISUP | ISDN User Part |
| ITP | IAN Transfer Protocol |
| LA | Location Area |
| LAI | Location Area Identification |
| LLC | Logical Link Control |
| MAC | Medium Access Control |
| MAP | Mobile Application Part |
| MDN | Mobile Directory Number |
| MG | Media Gateway |
| MM | Mobility Management |
| MM | Mobility Management |
| MS | Mobile Station |
| MSC | Mobile Switching Center |
| MSC | Mobile Switching Center |
| MSISDN | Mobile Station International ISDN Number |
| MSRN | Mobile Station Roaming Number |
| MTP1 | Message Transfer Part Layer 1 |
| MTP2 | Message Transfer Part Layer 2 |
| MTP3 | Message Transfer Part Layer 3 |
| NAPT | Network Address and Port Translation |
| NAT | Network Address Translation |
| NS | Network Service |
| PCM | Pulse Code Modulation |
| PCS | Personal Communication Services |
| PCS | Personal Communications Services |
| PLMN | Public Land Mobile Network |
| POTS | Plain Old Telephone Service |
| PPP | Point-to-Point Protocol |
| PPPoE | PPP over Ethernet protocol |
| PSTN | Public Switched Telephone Network |
| P-TMSI | Packet Temporary Mobile Subscriber Identity |
| QoS | Quality of Service |
| RA | Routing Area |
| RAC | Routing Area Code |
| RAI | Routing Area Identification |
| RAI | Routing Area Identity |

APPENDIX I-continued

Table Of Acronyms

| | |
|---|---|
| RF | Radio Frequency |
| RFC | Request for Comment (IETF Standard) |
| RLC | Radio Link Control |
| RR | Radio Resource Management |
| RTCP | Real Time Control Protocol |
| RTCP | Real Time Control Protocol |
| RTP | Real Time Protocol |
| RTP | Real Time Protocol |
| SAP | Service Access Point |
| SCCP | Signaling Connection Control Part |
| SCO | Synchronous Connection-Oriented |
| SDCCH | Standalone Dedicated Control Channel |
| SGSN | Serving GPRS Support Node |
| SMC | Short Message Service Centre |
| SMS | Short Message Service |
| SM-SC | Short Message Service Centre |
| SMS-GMSC | Short Message Service Gateway MSC |
| SMS-IWMSC | Short Message Service Interworking MSC |
| SNDCP | SubNetwork Dependent Convergence Protocol |
| SS | Supplementary Service |
| SSL | Secure Sockets Layer |
| TCAP | Transaction Capabilities Application Part |
| TCP | Transmission Control Protocol |
| TCP | Transmission Control Protocol |
| TLLI | Temporary Logical Link Identity |
| TMSI | Temporary Mobile Subscriber Identity |
| TRAU | Transcoder and Rate Adaptation Unit |
| TTY | Text telephone or teletypewriter |
| UDP | User Datagram Protocol |
| UMA Cell | Unlicensed Mobile Access Cell (see also IAN) |
| UMTS | Universal Mobile Telecommunication System |
| UNC | UMA Network Controller (see also INC) |
| VLR | Visited Location Register |
| VMSC | Visited MSC |
| WLAN | Wireless Local Area Network |
| WSP IP | Wireless Service Provider's IP Network (i.e., provider of IAN service) |

What is claimed is:

1. A method for locating an unlicensed mobile access (UMA) subscriber, comprising:

establishing, using a mobile station (MS) supporting both UMA and licensed wireless network sessions, a first UMA session with a UMA service provider;

identifying an access point (AP) used to provide an unlicensed wireless link to host the first UMA session;

determining if location information is available for the AP;

when the location information is not available, employing a licensed wireless network-based location service to identify the location of the MS; and storing location information for the MS obtained via the licensed wireless network-based location service as a location for the AP, said location information made accessible to the UMA service provider.

2. The method of claim 1, further comprising:

establishing a second UMA session with the UMA service provider using the same AP as the first UMA session;

forwarding information identifying the AP to the UMA service provider;

retrieving the location for the AP; and employing the location of the AP as the location of the UMA subscriber.

3. A method for locating an unlicensed mobile access (UMA) subscriber, comprising:

establishing, using a mobile station (MS) supporting both UMA and licensed wireless network sessions, a first UMA session with a UMA service provider;

identifying an access point (AP) used to provide an unlicensed wireless link to host the first UMA session, wherein the AP is communicably coupled to a UMA network controller (UNC) operated by the UMA service provider;

determining if location information is available for the AP;

when the location information is not available, employing a licensed wireless network-based location service to identify the location of the MS; and sending a location service request to a gateway mobile location center (GMLC).

4. The method of claim 3, wherein the location service request comprises a Location Inter-operability Forum Mobile Location Protocol (LIF MLP) message.

5. A method for locating an unlicensed mobile access (UMA) subscriber, comprising:

establishing, using a mobile station (MS) supporting both UMA and licensed wireless network sessions, a first UMA session with a UMA service provider;

identifying an access point (AP) used to provide an unlicensed wireless link to host the first UMA session;

determining if location information is available for the AP;

when the location information is not available, employing a licensed wireless network-based location service to identify the location of the MS;

sending a register message including a medium access control (MAC) address of the AP and an international mobile subscriber identity (IMSI) for the MS from the MS to the UNC;

determining the location of the AP; and returning a register acknowledgment message to the MS to register the MS with the UMA service.

6. A method for locating an unlicensed mobile access (UMA) subscriber, comprising:

establishing, using a mobile station (MS) supporting both UMA and licensed wireless network sessions, a first UMA session with a UMA service provider;

identifying an access point (AP) used to provide an unlicensed wireless link to host the first UMA session;

determining if location information is available for the AP; and when the location information is not available, employing a licensed wireless network-based location service to identify the location of the MS, wherein location of the MS is determined by employing at least one of Assisted GPS (AGPS), Angle of Arrival (AOA), Enhanced Observed Time Difference (E–OD), Cell Identity plus Timing Advance (Cell ID+TA), and Time Difference of Arrival (TDOA) location techniques.

7. A system comprising:

an unlicensed mobile access (UMA) network controller (UNC) operable to communicate with a telecommunications network and communicably coupled to one or more unlicensed wireless base stations comprising wireless access points (AP) that support communication with one or more mobile stations (MS) via unlicensed wireless links, each MS configured to support both UMA sessions and licensed wireless network sessions; and a service provisioning server, communicably coupled to the UNC, to store data corresponding to UMA subscriber services provided by an operator of the UNC, wherein the UNC is operable to perform operations to support the UMA subscriber services, including:

establishing a first UMA session for a MS;

identifying an AP used to provide an unlicensed wireless link used to host the first UMA session;

determining if location information is available for the AP via the service provisioning server;

when the location information is not available, submitting a location service request to a licensed wireless network-based location service to identify the location of the MS; and storing location information returned by the licensed wireless network-based location service identifying the location of the MS as the location of the AP.

8. The system of claim 7, wherein the UNC is operable to provide a location identifier to a public safety access point when the MS initiates an emergency services call during a UMA session.

9. The system of claim 7, wherein the location service request comprises a Location Inter-operability Forum Mobile Location Protocol (LIF MLP) message.

10. The system of claim 7, wherein the UNC is communicably coupled to a GSM network, and the UNC is configured to provide the functions of a GSM base station controller.

11. The system of claim 7, wherein the UNC is communicably coupled to a mobile service center for the GSM network via an A-interface.

12. The system of claim 7, wherein the UNC is communicably coupled to a Serving GPRS (General Packet Radio Service) Support Node (SGSN) for the GSM network via a Gb-interface.

13. The system of claim 7, wherein the MS is configured to communicate with the AP via an IEEE 802.11-based unlicensed wireless link.

14. The system of claim 7, wherein the MS is configured to communicate with the AP via a Bluetooth-based unlicensed wireless link.

15. The system of claim 7, wherein the UNC is further operable to:

establish a second UMA session with an MS via the same AP used to access the first UMA session; and determining the location of a subscriber using the MS by retrieving a location record for the AP from the service provisioning server.

16. A method for locating an unlicensed mobile access (UMA) subscriber, comprising:

establishing, using a mobile station (MS) supporting both UMA and licensed wireless network sessions, a first UMA session with a UMA service provider;

identifying an access point (AP) used to provide an unlicensed wireless link to host the first UMA session;

determining if location information is available for the AP; and when the location information is not available, employing a licensed wireless network-based location service to identify the location of the MS, wherein said location information comprises a location estimate, wherein the location estimate comprises geographic longitude and geographic latitude.

17. The method of claim 16, wherein the MS is configured to communicate with the AP via an unlicensed wireless network link.

18. A method for locating an unlicensed mobile access (UMA) subscriber, comprising:

establishing, using a mobile station (MS) supporting both UMA and licensed wireless network sessions, a first UMA session with a UMA service provider;

identifying an access point (AP) used to provide an unlicensed wireless link to host the first UMA session;
determining if location information is available for the AP; and
when the location information is not available, employing a licensed wireless network-based location service to identify the location of the MS, wherein said location information comprises a location estimate, wherein the location estimate comprises a street address.

19. The method of claim 18, wherein the access point comprises an IEEE 802.11-based AP that hosts an IEEE 802.11-based wireless local area network (WLAN).

20. The method of claim 18, wherein the access point comprises Bluetooth AP that hosts a Bluetooth personal local area network (PLAN).

* * * * *